United States Patent
Mendez et al.

(10) Patent No.: US 10,033,791 B2
(45) Date of Patent: Jul. 24, 2018

(54) INTEGRATING CO-BROWSING WITH OTHER FORMS OF INFORMATION SHARING

(71) Applicant: Glance Networks, Inc., Arlington, MA (US)

(72) Inventors: Deborah Mendez, Arlington, MA (US); Edward F. Hardebeck, Brookline, MA (US); Richard L. Baker, Belmont, MA (US); Claudio Topolcic, Concord, MA (US)

(73) Assignee: Glance Networks, Inc., Arlington, MA (US)

( * ) Notice: Subject to any disclaimer, the term of this patent is extended or adjusted under 35 U.S.C. 154(b) by 339 days.

(21) Appl. No.: 14/598,919

(22) Filed: Jan. 16, 2015

(65) Prior Publication Data
US 2015/0149645 A1 May 28, 2015

Related U.S. Application Data

(63) Continuation of application No. PCT/US2013/049615, filed on Jul. 8, 2013.
(Continued)

(51) Int. Cl.
| | |
|---|---|
| *H04L 29/08* | (2006.01) |
| *G06F 17/30* | (2006.01) |
| *G06F 17/22* | (2006.01) |
| *G06Q 30/00* | (2012.01) |
| *H04L 12/58* | (2006.01) |

(Continued)

(52) U.S. Cl.
CPC ............ *H04L 67/02* (2013.01); *G06F 3/0484* (2013.01); *G06F 17/2247* (2013.01); *G06F 17/30873* (2013.01); *G06Q 30/016* (2013.01); *H04L 51/046* (2013.01); *H04L 65/403* (2013.01); *H04L 67/141* (2013.01)

(58) Field of Classification Search
CPC ....................................................... H04L 67/02
USPC ........................................................ 709/227
See application file for complete search history.

(56) References Cited

U.S. PATENT DOCUMENTS

| | | |
|---|---|---|
| 5,107,443 A | 4/1992 | Smith et al. |
| 5,796,396 A | 8/1998 | Rich |

(Continued)

OTHER PUBLICATIONS

Lowet et al., "Co-Browsing Dynamic Web Pages", 2009.*
(Continued)

*Primary Examiner* — O. C. Vostal
(74) *Attorney, Agent, or Firm* — Anderson Gorecki LLP

(57) ABSTRACT

A co-browse service uses JavaScript to allow a web page shown in a user's browser to be viewed remotely. Updates to the web page are rendered into HTML and forwarded on the co-browse session. Aspects of the web page that should not be visible are specified in a list of masked elements which prevents the JavaScript from transmitting the content of those elements on the co-browse session. A person viewing the web page at the remote location can select objects to have those objects highlighted within the user's browser. Likewise the person viewing the web page may manipulate the objects by selecting objects and entering information into the objects. Updates to the web page are collected and aggregated such that only the most recent updates are forwarded on the co-browse session. Updates that don't affect the DOM, such as hover state, are also transmitted on the session.

8 Claims, 25 Drawing Sheets

Related U.S. Application Data

(60) Provisional application No. 61/673,629, filed on Jul. 19, 2012, provisional application No. 61/776,016, filed on Mar. 11, 2013.

(51) Int. Cl.
*H04L 29/06* (2006.01)
*G06F 3/0484* (2013.01)

(56) References Cited

U.S. PATENT DOCUMENTS

| | | | |
|---|---|---|---|
| 5,838,300 A | 11/1998 | Takagi et al. | |
| 6,329,984 B1 | 12/2001 | Boss et al. | |
| 7,149,776 B1* | 12/2006 | Roy | G06F 17/30873 709/205 |
| 7,370,269 B1* | 5/2008 | Prabhu | G06F 17/30873 715/201 |
| 7,922,493 B1* | 4/2011 | Gennaro | G06F 17/30893 434/107 |
| 7,941,755 B2 | 5/2011 | Siegrist et al. | |
| 8,051,178 B2* | 11/2011 | Skidgel | G06F 17/30873 709/203 |
| 8,225,348 B2* | 7/2012 | Morris | H04N 7/17318 725/37 |
| 8,261,198 B2* | 9/2012 | Burckart | G06F 17/30873 709/204 |
| 8,682,977 B1* | 3/2014 | Roy | H04L 65/403 709/205 |
| 8,966,374 B1 | 2/2015 | Hardebeck et al. | |
| 8,976,955 B2* | 3/2015 | Liberman Ben-Ami | H04M 3/5191 379/265.01 |
| 9,063,637 B2* | 6/2015 | Lisse | G06F 3/0483 |
| 9,123,019 B1* | 9/2015 | Roy | G06Q 10/10 |
| 9,166,882 B1* | 10/2015 | Hill | H04L 67/04 |
| 2003/0097448 A1* | 5/2003 | Menezes | H04L 29/06 709/227 |
| 2003/0225836 A1* | 12/2003 | Lee | H04M 3/567 709/205 |
| 2004/0104940 A1* | 6/2004 | Giacomelli | G06F 3/0481 715/769 |
| 2004/0128342 A1* | 7/2004 | Maes | G06F 17/30017 709/200 |
| 2004/0215731 A1* | 10/2004 | Tzann-en Szeto | H04L 51/04 709/207 |
| 2004/0230889 A1* | 11/2004 | Ishiyama | G06F 17/30905 715/205 |
| 2005/0086344 A1* | 4/2005 | Suesserman | H04L 67/34 709/227 |
| 2005/0091572 A1 | 4/2005 | Gavrilescu et al. | |
| 2005/0097159 A1* | 5/2005 | Skidgel | G06F 17/30873 709/200 |
| 2005/0102156 A1* | 5/2005 | Linduff | G06Q 10/1057 705/322 |
| 2006/0164982 A1 | 7/2006 | Arora et al. | |
| 2007/0044032 A1* | 2/2007 | Mollitor | H04L 41/145 715/764 |
| 2007/0282623 A1 | 12/2007 | Dattorro | |
| 2007/0294626 A1 | 12/2007 | Fletcher et al. | |
| 2007/0300291 A1 | 12/2007 | Bomgaars et al. | |
| 2008/0016155 A1 | 1/2008 | Khalatian | |
| 2008/0052377 A1* | 2/2008 | Light | G06Q 10/107 709/218 |
| 2008/0059961 A1* | 3/2008 | Miranda-Steiner | G06F 9/453 717/171 |
| 2008/0065996 A1 | 3/2008 | Noel et al. | |
| 2008/0091829 A1 | 4/2008 | Spataro | |
| 2008/0147877 A1 | 6/2008 | Brown et al. | |
| 2008/0177862 A1 | 7/2008 | Arora et al. | |
| 2008/0183817 A1 | 7/2008 | Baek et al. | |
| 2009/0019367 A1 | 1/2009 | Cavagnari et al. | |
| 2009/0037517 A1* | 2/2009 | Frei | G06F 17/30893 709/202 |
| 2009/0164581 A1* | 6/2009 | Bove | G06F 17/30873 709/205 |
| 2009/0228801 A1 | 9/2009 | Lee et al. | |
| 2009/0271713 A1* | 10/2009 | Stull | G06Q 10/10 715/753 |
| 2009/0292999 A1 | 11/2009 | LaBine et al. | |
| 2010/0023865 A1* | 1/2010 | Fulker | G06F 3/04817 715/734 |
| 2010/0037153 A1* | 2/2010 | Rogers | G06F 3/0481 715/758 |
| 2010/0082747 A1* | 4/2010 | Yue | G06F 17/30873 709/204 |
| 2010/0083135 A1 | 4/2010 | Zawacki et al. | |
| 2010/0123665 A1* | 5/2010 | Birkler | G06F 3/0421 345/173 |
| 2010/0131868 A1* | 5/2010 | Chawla | G06F 3/044 715/759 |
| 2010/0167715 A1* | 7/2010 | Domene | H04M 1/274525 455/418 |
| 2010/0218105 A1 | 8/2010 | Perov et al. | |
| 2010/0250756 A1* | 9/2010 | Morris | G06F 17/30899 709/228 |
| 2010/0257451 A1* | 10/2010 | Halevi | G06F 15/16 715/733 |
| 2010/0287229 A1* | 11/2010 | Hauser | G06F 21/316 709/203 |
| 2010/0306642 A1* | 12/2010 | Lowet | G06F 17/30873 715/234 |
| 2011/0119352 A1* | 5/2011 | Perov | G06F 17/30873 709/218 |
| 2011/0145744 A1* | 6/2011 | Haynes | G06F 3/0481 715/766 |
| 2011/0154219 A1* | 6/2011 | Khalatian | G06F 3/1462 715/751 |
| 2011/0173589 A1* | 7/2011 | Guttman | G06F 17/30873 717/125 |
| 2011/0197124 A1 | 8/2011 | Garabenta | |
| 2011/0285757 A1* | 11/2011 | Cummings | G09G 3/2003 345/690 |
| 2011/0289157 A1* | 11/2011 | Pirnazar | G06F 17/30873 709/206 |
| 2012/0005567 A1* | 1/2012 | Burckart | G06F 3/1454 715/234 |
| 2012/0005598 A1* | 1/2012 | Burckart | G06F 17/30873 715/753 |
| 2012/0089669 A1* | 4/2012 | Berg | H04J 3/0667 709/203 |
| 2012/0119993 A1* | 5/2012 | Bozionek | G06F 3/011 345/161 |
| 2012/0185784 A1* | 7/2012 | Katz | G06F 17/30873 715/760 |
| 2012/0210242 A1* | 8/2012 | Burckart | G06F 17/30873 715/744 |
| 2012/0240054 A1* | 9/2012 | Webber | G06Q 10/107 715/752 |
| 2013/0071085 A1* | 3/2013 | Ryman | H04N 5/783 386/230 |
| 2013/0080884 A1* | 3/2013 | Lisse | G06F 3/0483 715/255 |
| 2013/0086615 A1* | 4/2013 | Williams | H04N 21/41407 725/62 |
| 2013/0151372 A1* | 6/2013 | Liu | G06Q 30/08 705/26.9 |
| 2013/0212466 A1 | 8/2013 | Khalatian | |
| 2013/0339536 A1 | 12/2013 | Burckart | |
| 2014/0019534 A1* | 1/2014 | Handrigan | G06F 17/30873 709/204 |
| 2014/0052868 A1* | 2/2014 | Burckart | G06F 17/30873 709/227 |

OTHER PUBLICATIONS

Maly et al., "CoBrowser: Surfing the Web Using a Standard Browser", 2001.*
Spika, "Synchronizing Multimodel User Input Information in a Modular Mobile Software Platform", 2010.*

(56) References Cited

OTHER PUBLICATIONS

*International Search Report* dated Dec. 19, 2013, from related international application PCT/US2013/049615.
*Invitation to Pay Additional Fees and, Where Applicable, Protest Fee*, dated Sep. 27, 2013, from related international application PCT/US2013/049615.
*IBM WebSphere Commerce Version 7*, 2011, 33 pages.
D. Lowet, et al., *Co-Browsing Dynamic Web Pages*, IW3C2, Apr. 2009, pp. 941-950.
C. Yue, et al., *RCB: A Simple and Practical Framework for Rea0time Collaborative Browsing*, Apr. 2009, 23 pages.
*How to capture screen application to .jpg and post it on wall*, www.stackoverflow.com, Jan. 2012, 1 page.
*JavaScript and AJAX Forum*, www.webmasterworld.com message 3145068, Nov. 2006, 3 pages.
*Convert HTML to Image*, www.converthtmltoimage.com 2 pages.
*Capture webpage screenshot in Chrome*, code.google.com, Apr. 2011, 3 pages.
*Screen Scrape Data Capture of AJAX generated HTML source code*, www.odesk.com Jul. 14, 2011, 2 pages.
V. Patel, *Capture Website Screenshot with Screenshot Capture Utilities*, www.viralpatel.com May 8, 2009, 4 pages.
Livelook Technical Brief, *How LiveLook's Co Browse Technology Compares to Other Solutions*, 2012, 4 pages.
Emergent Web Intelligence: Advanced Semantic Technologies, Advanced Information and Knowledge Processing, *Web-Based Support by Thin-Client Co-browsing*, 2010, pp. 395-428, 5 pages.
CoBrowse, www.cobrowse.mozdev.org, 2005, 3 pages.
*Extended European Search Report* dated Apr. 19, 2016, from related EP application 13819517.7.
Anonymous: "Desktop sharing—Wikipedia, the free encyclopedia" Jul. 14, 2012, pp. 1-3.
U.S. Appl. No. 14/598,743.
U.S. Appl. No. 14/598,803.
U.S. Appl. No. 14/598,862.
U.S. Appl. No. 14/598,919.

\* cited by examiner

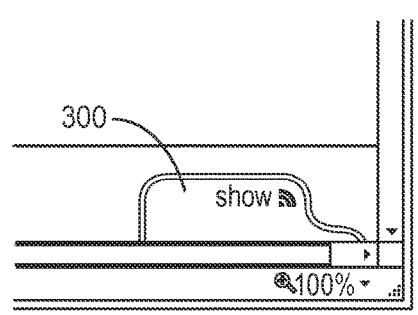
FIG. 3A
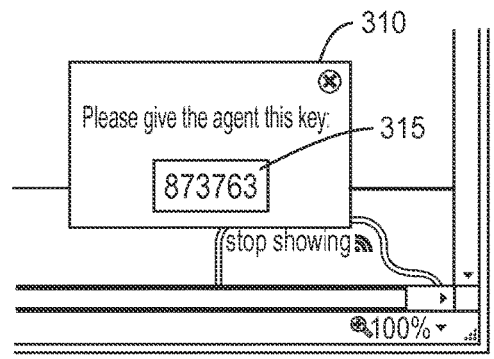
FIG. 3B
FIG. 4
FIG. 5
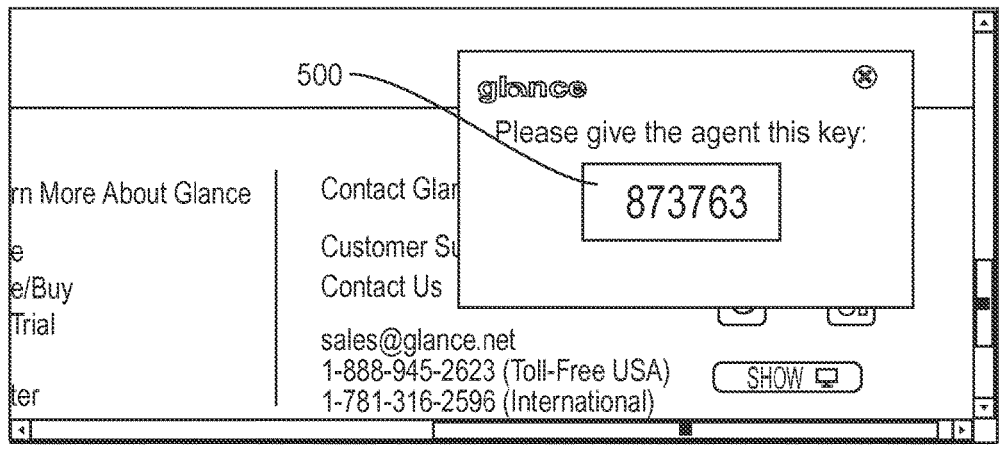

FIG. 10 salesforce

Home  Chatter  Leads  Contacts  Files  +     Ed Hardebeck ▼   Help   For

Search [        ] (Search)

Search Results vera [        ] (Search Again) ☐ Options...

☑ Search Chatter Feeds

☐ Records

Accounts (0)
Activities (0)
Assets (0)
Attachments (0)

📇 Contacts (2)                                                                              ⎯⎯1000

| Action | Name | Account Name | Account Site | Phone | Email | Com |
|--------|------|--------------|--------------|-------|-------|-----|
| Edit | Vera Visitor | | | 666-6666 | vear@acme.com | eha |
| Edit | Vera Wang | | | | | eha |

FIG. 12

| Help | Name | Email | Account Name | Phone | Time in Site | Page | In Cart |
|---|---|---|---|---|---|---|---|
| CoBrowse | Visitor Vera | vera@acme.com | | 666-6666 | 15:20 | Checkout | $75.99 |
| CoBrowse | Anonymous | | | | 3:02 | Closeouts - Shoes | |
| CoBrowse | Bair Betty | bblair@bankingco.com | American Banking Corp. | (610) 265-9100 | 10:08 | Ties | $23.00 |
| CoBrowse | Baker Rich Scott | scott@glance.net | | | 6:04 | Sony KDV55L - Specs | |
| CoBrowse | Bertuzzi Matt | mbertuzzi@bridgegroupinc.com | TBG | | 23:15 | FAQ - Shipping | |

FIG. 14A

| Info | Navigation | Page Viewer |
|---|---|---|
| ⊞ Visitor Info | | |
| Contact ID | Vera | |
| Country | US, CO, Denver | |
| Organization | | |
| ISP | | |
| Time Zone | MST | |
| IP | 195.62.31.20 | |
| ⊞ Session Info | | |
| State | ☺ Chatting | |
| Agent | ⚇ Guyy | |
| Number of Pages | 0 | |
| Browser | 🕸 Apache-HttpClient/4.0-beta2 | |
| Duration | 00:00:15 | |
| Wait Time | 00:00:29 | |
| ⊞ Pre-Chat Survey | | |
| What is your name? | Vera Visitor | |
| Email | vera@acme.com | |
| ⊞ Other Variables | | |

FIG. 16 salesforce

Home   Chatter   Leads   Contacts   + denver|
Search for *denver** (starts with)           ⊗ Search

Ed Hardebeck ▼   Help

Search Results

◉ Search Chatter Feeds

☐ Records denver                                       [Search Again] ⊕ Options...

⊞ Contacts (1)

| Action | Name | Account Name | Account Site | Phone | Email |
|--------|------|--------------|--------------|-------|-------|
| Edit | Vera Visitor | | | 666-6666 | vear@acme.com |

Accounts (0)
Activities (0)
Assets (0)

FIG. 20

INTEGRATING CO-BROWSING WITH OTHER FORMS OF INFORMATION SHARING

CROSS REFERENCE TO RELATED APPLICATIONS

This application is a continuation of International Application PCT/US2013/049615, filed Jul. 8, 2013, which claims priority to U.S. Provisional Patent Application No. 61/776,016, filed Mar. 11, 2013, and U.S. Provisional Patent Application No. 61/673,629, filed Jul. 19, 2012, the content of each of which is hereby incorporated herein by reference.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

FIELD

The field relates to communication sessions and, more particularly, to a method and apparatus for integrating co-browsing with other forms of information sharing.

DESCRIPTION OF THE RELATED ART

Companies that rely on web sites for sales and other customer interaction often provide customer support so that, if a visitor is having trouble navigating the site, the person is able to interact with a live person such as a customer service agent. The agent may interact with the visitor using a text based communication session (chat session) or using a voice based communication session (telephone call).

For example, a web site operated by a bank may include a link to a help service, to allow potential customers to chat or talk with a customer service representative to obtain more detailed information about features available on their accounts. When the customer clicks on the help button, a chat session or voice session is launched, which will cause a customer representative to be connected to the customer. Messages typed into the chat session are relayed between the customer and the customer representative, or the agent and customer have a live conversation, which enables the customer to describe the problem and obtain assistance from the agent.

When a visitor is having trouble accessing or using a particular aspect of the web site, the agent can try to instruct the customer on how to overcome the difficulty. Unfortunately, the agent's ability to provide assistance may be hampered in this context by an inability of the agent to see the customer's view of the website. Accordingly, from the agent's standpoint, it would be advantageous to provide the agent with the ability to see what the visitor is seeing.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

A co-browse service allows a vendor's customer service agents to see the web pages that a customer is currently viewing. Knowing exactly what the customer is seeing, the agent is then in a much better position to provide useful assistance. Privacy is enhanced by masking customer sensitive data from the agent's view so that the agent is able to provide assistance without obtaining access to the customer's private data. In one embodiment, ECMAScript such as JavaScript is used to mirror browser state from a visitor to an agent.

A list of masked fields, and potentially divs and pages, is used to prevent the visitor from transmitting information associated with fields that are intended to contain sensitive data to prevent the information from leaving the visitor's browser. Masking a field may be implemented, for example, on an HTML input element by preserving the HTML element on the agent side but the contents or state of the visitor input to the input element are not passed to the agent.

The view of the web page depends on (a) the current Document Object Model (DOM) represented by a hierarchy of HTML elements as well as (b) state information such as mouse position, scroll offsets, hover and focus states. To enable the view at the agent to be synchronized with the view at the visitor, a page's initial DOM tree, as well as any subsequent changes to it, are forwarded to the agent, but with <script> tags removed. This allows the agent to have a view of what the visitor sees without requiring the agent to have synchronized local state information (e.g. cookies, browser local storage) which would be required if the agent's browser were to run the same script as the visitor's browser. In addition, changes that don't affect the Document Object Model (DOM), for example in connection with hover state, are detected and forwarded to the agent separately to enable the agent to simulate the browser state.

Co-browsing sessions may be established via information available to the agent in multiple forms. Example information systems include chat software, click-to-call customer relationship management software (where a visitor supplies his phone number so an agent can call him back), and other software systems.

Co-browsing sessions may be combined with other forms of interactive information sharing sessions, including screen sharing sessions, to enable an agent to utilize additional forms of communication while interacting with a visitor. A session may also be established during a traditional phone call or third party chat session by verbally exchanging or typing a code that appears when one of the participants clicks an object on the web page.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

FIGS. 3A, 3B, and 4-17 show ways to enable a co-browsing session associated with a visitor to a website to be located by an agent;

FIGS. 19-20 show an example way of highlighting information by an agent to a visitor;

DETAILED DESCRIPTION

The following detailed description sets forth numerous specific details to provide a thorough understanding of one or more embodiments of the invention. However, those skilled in the art will appreciate that the invention may be practiced without these specific details. In other instances, well-known methods, procedures, components, protocols, algorithms, and circuits have not been described in detail so as not to obscure the invention.

Definitions

Customer: A customer of the co-browsing service who subscribes to the co-browsing service. An example customer is the vendor (e.g. the company that owns vendor website 16) of FIG. 1.

Website: The website owned by the customer that is to be supported via co-browse.

Group id: A unique id assigned to each customer website that is to be co-browsed.

Visitor: Anyone navigating the website.

Agent: The representative who supports the visitor in carrying out various tasks on the website, such as completing a purchase.

Masked field: An input field in a form or on the website that should be masked from view and not visible to agents. Masked fields, for example, may contain containing sensitive data such as a visitor credit card number.

Masked object: An input field on the visitor's web browser that is masked from input by agents. Masked objects, for example, may include fields, forms, divs, pages, links, buttons, and other objects that may be required to remain under the control of the visitor. The agent is not allowed to input, modify, or click on a masked object when running in remote control.

CServer: A secured server that hosts the co-browse sessions, accepting session updates from the visitor and relaying them to the agent.

co-browse webserver: A web server controlling access to co-browse sessions by visitors and agents. The co-browse webserver may be collocated with the Cserver or may be a separate entity on the network.

Co-Browse Overview

Figure 1:
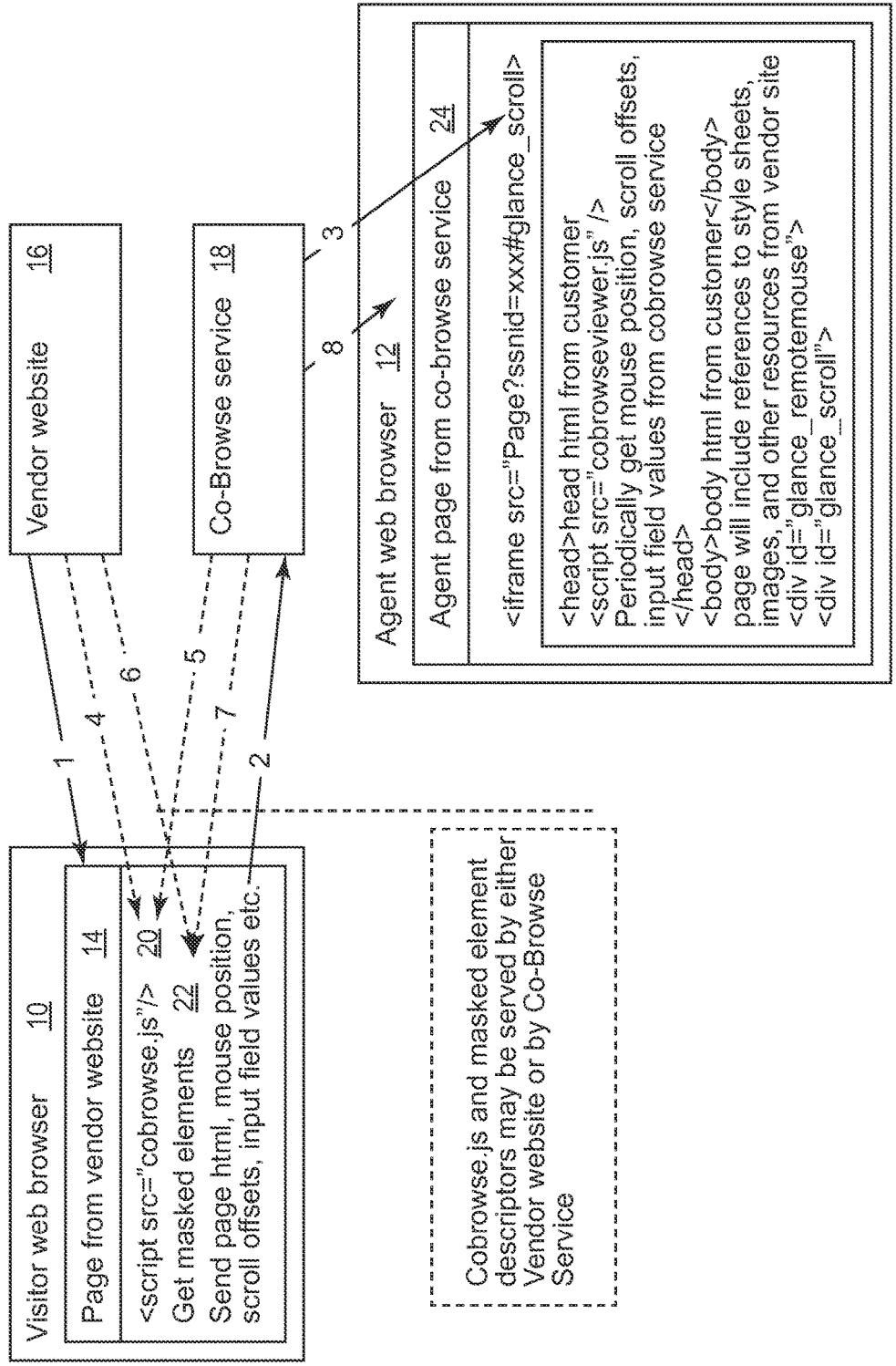
FIGS. 1 and 2 are functional block diagrams illustrating the flow of information between participants in a co-browsing customer support system.

FIG. 1 shows a network diagram of a co-browsing scenario in which the content of a visitor's browser 10 is visible in an agent's browser 12. In the embodiment shown in FIG. 1, the visitor browser obtains a page 14 from a vendor website 16. Arrow 1 shows the download of the web page from the website to the visitor. A co-browse service 18 facilitates the co-browse session by relaying web page updates (arrow 2) from the visitor browser to the agent web browser 12 (arrow 3). To cause the visitor browser 10 to provide these updates, script 20 (JavaScript in one embodiment) is downloaded to the visitor browser either from the vendor website (arrow 4) or from the co-browse service (arrow 5). Alternatively, the JavaScript may be maintained as a plugin in the visitor browser. To enable privacy, as discussed in greater detail below, a list of masked elements 22 is downloaded to the visitor browser. Like the script, the list of masked elements may be downloaded from the vendor website (arrow 6) or may be downloaded from the co-browse service (arrow 7). The list of masked elements instructs the script which elements (e.g. which elements of the DOM) should not be transmitted on the co-browse session. The agent's browser also downloads a page 24 from the co-browse service (arrow 8) in which the view of the visitor's browser contents will be displayed during the co-browse session.

Although an embodiment will be described in which script 20 is described as being implemented using JavaScript, other forms of scripting language may be utilized as well. For example, JavaScript is an implementation of a scripting language standard by ECMA International in the ECMA-262 specification. Other implementations of this standard include JScript and ActionScript. Thus, although an implementation will be described in which JavaScript is used the invention is not limited to this particular implementation as other forms of script may be used as well.

The co-browse solution enables the agent to view the web page (vendor website) that a visitor is presently visiting. Since the co-browsing session relies only on JavaScript that is downloaded during the web browsing session, the visitor is not required to manually install any software or plugins or dismiss any security warning dialogs in order for the agent to see the visitor's browser. Likewise, since the JavaScript is part of the web page served from the vendor website, the JavaScript will not carry over to any other web pages, which means that the agent will not be able to see any pages from other websites, or anything else on the visitor's desktop.

As described in greater detail below, the co-browse solution enables the agent to see precisely what the visitor is seeing. For example, if the webpage is not entirely visible to the visitor, the agent will only see the portion of the web page that is visible. This view will update automatically as the visitor scrolls or resizes the page. Where the visitor has multiple tabs open, the agent is only able to see the tab that has focus so that the agent views what the visitor is seeing. The agent can also see the position of the visitor's mouse pointer, which allows the agent to understand where the visitor is focused while interacting with the web page. If the agent's browser is the active window on the agent's computer, the agent will also be able to see which input field currently has focus on the visitor side. If the visitor opens a select box, that select box will also open on the agent side.

To enable the agent to interact with the visitor in a visual manner, the agent is allowed to click on specific elements or regions of the web page, on the agent browser 12. When the agent does this, the corresponding elements will be visually highlighted in both the agent's and the visitor's browser, so that the agent can direct the visitor's attention to a specific part of the web page. For example, the highlighting may take the form of a frame drawn around the specified elements, or some other way of visually distinguishing those elements. Preferably the highlighting is visible to the visitor while the agent holds down his mouse button. A few seconds after releasing, or some other specified short period of time it will disappear automatically or fade away without further action by the agent.

Optionally, an agent may be able to provide input to the visitor browser 10. For example, the agent may be able to type information into selected elements on the web page 14 shown on the visitor's browser 10, change the settings of drop down lists, select radio buttons or checkboxes or otherwise interact with input elements on the page. Depending on the implementation an agent may be able to click on buttons or links on behalf of the visitor.

To protect the visitor's sensitive data, such as visitor specific credit card numbers and other sensitive data, form fields or areas of the web page containing sensitive data such as credit card numbers are masked from view so that the sensitive data is not provided to the agent. Since the data never leaves the visitor's browser, the co-browse service will never have access to or interact with visitor sensitive data. Masking data at the visitor thus avoids requiring the visitor to transmit the sensitive data on the network or otherwise relinquish control over the sensitive data so that the data never leaves the visitor's control.

Optionally, the masked fields may be identified to the visitor to enable the visitor to know which fields are masked and which fields are not being masked. Providing an indication of this nature, such as a green box outlining the fields that are being masked, may provide the visitor with a sense of security by knowing that the information in those fields is not visible to the agent and is not leaving the visitor's browser.

Since the co-browse service described below is based on JavaScript, instead of a platform such as Flash, Java, or SilverLight which is not supported in all web browsers, the co-browse service provides the agent the ability to view the visitor's browser even if the visitor is accessing the site using a mobile device, such as a smartphone or tablet. Likewise, the co-browse solution will also work with PCs/Macs. Likewise, uploading the visitor DOM and state information (vs. just sending the visitor page URL) enables the co-browse session to start at any point while the visitor is accessing the vendor website without requiring the visitor to re-create his/her browser's state. Finally, since the only change to the vendor website is the inclusion of the script, the co-browse service enables agents to provide co-browse based support to visitors with few or no changes to the vendor's website.

Implementation

According to an embodiment, a co-browse service relies on a script tag that the vendor agrees to insert into the vendor website. This JavaScript (e.g. cobrowse.js) may be passed from the web site to the visitor, or may be passed directly from the co-browse service to the visitor, when the visitor loads the vendor web page. This JavaScript causes the visitor browser, once a co-browse session has been started, to upload the vendor web page HTML and other data from the visitor to the co-browse service. The co-browse service, in turn, renders this data as web pages for the agent to view.

Alternatively, rather than having the JavaScript (e.g. cobrowse.js) loaded from the web site to the visitor, a person could manually install the JavaScript code as a browser plug-in. The advantage of having the plug-in is that it need not be website specific and, accordingly, could allow the person to co-browse websites which have not been modified to include the co-browse script. Specifically, the JavaScript contained in the plug-in will cause browser state to be forwarded to the co-browsing service regardless of what web site the person ("leader") accesses. This may be useful, for example, where the leader would like to share their web experience with other "followers", so all can enjoy the social experience of visually following along as the leader surfs the web, for example in connection with social shopping.

In some instances, the vendor's web site might already have other existing JavaScript, for example from a chat tool or click-to-call feature. That existing JavaScript could, with the vendor's permission, be used to invoke the cobrowse.js script. The benefit to this approach is that the vendor could pilot or deploy the co-browse solution with no modification at all to the vendor's web site.

In one embodiment, the JavaScript (cobrowse.js in this example) does the following either a) at the time a co-browse sessions starts, or b) when a page from the vendor website finishes loading, if a co-browse session has already been started:

1. Gets a descriptor of masked elements. A descriptor of masked elements may be retrieved dynamically from a server at runtime (via AJAX or websockets), or might be embedded as a JavaScript variable in the cobrowse.js file, e.g.:
Glance.CoBrowse.MaskedElements
=["input#credit_card_number","div[masked='true']"]
2. Periodically:
a. Clones the document head element, inserts a <base> tag indicating the base for any relative URL's on the page if a base tag is not already specified on the page, removes script tags and renders the cloned hierarchy as HTML. If a <base> tag is already specified on the page but there are <link> tags with relative URLs that precede it, those <link> URLs are converted to absolute URLs. Alternatively, adding the <base> tag and removal of script tags may be performed server-side by the co-browse service. Offloading these tasks to the visitor's browser also lets co-browse session servers handle more sessions.
b. Clones the document body element, removes script tags and hidden inputs, replaces the values of masked elements with dummy data, and renders the clone hierarchy as HTML. Many pages contain one or more hidden inputs with session state information that does not impact the page visually. If there is a gesture drawn on the visitor side, cobrowse.js removes the gesture element as well, since it is redundant with the gesture drawn on the agent side. Alternatively, removal of script tags may be performed server-side by the co-browse service. Offloading these tasks to the visitor's browser also lets co-browse session servers handle more sessions.
c. Iterates all user input objects (text fields, radio buttons, checkboxes, dropdowns) and collects any data input by user. The current state of canvas objects may also be collected.
d. Detects visitor mouse position
e. Detects visitor scroll offsets
f. Detects dimensions of visitor browser.
g. Detects which element on the page has focus
h. Detects whether any select box is open
i. Sends all of the above (if changed) to the Co-Browse Service. Data may be sent via an XMLHTTPRequest or XDomainRequest (AJAX), or Websockets, or some other means of cross-domain communication. Data sent in this step may be encoded and/or compressed before it is transmitted. Optionally, if only a portion of the data has changed, the changed portions only may be sent.

Note that (a) through (h) are repeated periodically, because JavaScript running in the visitor's browser may make modifications to the DOM.

Further, in both (a) and (b) script is removed from the HTML that is uploaded to the co-browse service, so that the script does not execute when downloaded to the agent. If script modifies the document element hierarchy in the customer's browser, changes to the hierarchy will be reflected to the agent via the co-browse service, so that the script does not need to run directly in the agent's browser.

Cobrowse.js may be hosted by the vendor or by the Co-Browse Service. This is shown by arrows 4 and 5 in FIG. 1. Likewise, the list of masked elements obtained by the visitor may be retrieved either from the vendor website (arrow 6) or from the Co-Browse Service (arrow 7). Since the list of masked elements is specific to the web site, it will be created by or for the web site to specify a list of elements in the website style sheet that should not be transmitted on the co-browse session. In one embodiment, the list of masked elements includes a list of Cascading Style Sheet (CSS) selectors for the website. The list is provided to the visitor to protect the visitor's private information. In one embodiment the list is created for each website, although it is also possible to make a unique list for each page of the web site that the Co-Browser service on which the co-browsing session is to be implemented.

Selection of elements to be masked may be implemented by allowing an administrator or other person to visually identify elements of the vendor web site and click on an administrative user interface, e.g. tool tip, to specify whether the visual element should be masked to protect sensitive information or is not required to be masked. Once the administrator has selected the elements to be masked, a MaskedElements descriptor is created based on this input. The Administrative user interface may be an implemented in cobrowse.js or may be implemented via software provided to the vendor to enable the vendor to select fields of the web site to be masked in connection with co-browsing sessions. To protect this list, the vendor is required to log in or otherwise be authenticated prior to making modifications to the vendor's MaskedElements descriptor.

Although use of a list of masked elements enables a set of elements to be masked without modifying the website, it is also possible to create a masked field definition which will automatically cause objects with an arbitrary defined attribute to be masked. For example, given a masked field definition of *[co-browse hide=true], an attribute such as co-browse hide="true" could then be used to identify elements on the website that should be masked.

Differential Updates

Often JavaScript running on a web page modifies the page DOM in response to various events such as page load, a timer, or a user action. Typical examples would be a rotating image marquis where the displayed image changes at regular time intervals, or a popup menu which is normally hidden but made visible in response to a user click.

For efficiency, visitor keeps a snapshot of the entire DOM tree and looks for differences. The visitor JavaScript, where possible, sends information about the incremental changes to the page to avoid re-uploading the entire page HTML. When an agent first views the page, the agent JavaScript downloads the initial page HTML from the CServer and then applies any incremental updates that arrived since the page was initially uploaded. Once the agent is viewing a page, any new incremental changes are pushed immediately to the agent as they are received by the Cserver from the visitor.

Frequently, the same elements change repeatedly on the visitor side. If the CServer were to store all of these changes as reported by the visitor, when an agent first connects to the session the agent would receive a group of updates that all referred to the same portion of the screen which could cause flashing of that portion of the screen. Likewise, if there is some delay between the time the agent retrieves a new page that the visitor has navigated to, and the time the agent page connects to the Cserver to retrieve subsequent updates to the page, multiple changes to the visitor screen may be forwarded to the agent at the same time causing flashing of the portion of the screen as subsequent updates are applied to the agent view.

Accordingly, in an embodiment the visitor accumulates all differences and forwards a cumulative difference since the full page has been sent. To generate the set of cumulative differences, the visitor JavaScript discards irrelevant changes which have since been overwritten by other changes to the DOM.

Types of Differential Updates

There are three types of incremental differences currently detected by the visitor: attribute differences (ATTR diff), content differences (CONTENT diff), and HTML differences (HTML diff).

Attribute Difference

An attribute difference indicates that the set of attributes of an element has changed. Attributes may have been added, modified, or removed. The ATTR diff specifies the new set of attributes. Optionally, the ATTR diff may specify with finer granularity which attributes have been added, modified, or removed.

An example of a JSON representation of an ATTR diff is:

```
{
"diff":"ATTR",
"path":"#account>div:nth-of-type(1)>table:nth-of-type(1)>tbody:nth-of-type(1)>tr:nth-of-type(1)>td:nth-of-type(1)>p:nth-of-type(1)",
"data":{"style":"color:red", "class":"boldparagraph"}
}
```

In this example, "diff" indicates the type of incremental difference, "path" indicates the css path to the element whose attribute(s) have changed, and "data" indicates the current set of attributes on the element. To process an ATTR diff, the agent JavaScript removes all the existing attributes of the element and applies all of the attributes specified in the ATTR diff.

Content Difference

A content difference indicates that the text content of an element has changed. The element must contain no Elements, only a text Node. An example of a JSON representation of a CONTENT diff is:

```
{
"diff":"CONTENT",
"path":"#account>div:nth-of-type(1)>table:nth-of-type(1)>tbody:nth-of-type(1)>tr:nth-of-type(1)>td:nth-of-type(1)>p:nth-of-type(1)",
"data":"somewhere over the rainbow"
}
```

In the case of the CONTENT diff, the "data" indicates the new text content of the element. To process a CONTENT diff, the agent JavaScript replaces the existing text content of an element with the current text content specified in the CONTENT diff.

HTML Difference

A third type of difference, an HTML diff, applies if the number, types, or values of child nodes have changed. An example of a JSON representation of an HTML diff is:

```
{
"diff":"HTML",
"path":"#anid",
"data":"abc <b>def</b> ghi"
}
```

Where "data" is the current HTML markup inside the element identified by #anid. Currently when an HTML diff is detected the visitor JavaScript sends a new full update. Alternatively, some HTML diffs could be handled as differential updates.

Cumulative Diffs

As DOM changes occur, the visitor sends a JSON representation of the changes to the Cserver. The Cserver forwards the incremental changes to any agents that have already received the visitor's page and have an open websocket connection to the Cserver. To ensure that the complete set of changes is available to any agents who have not yet retrieved the visitor's page or have not yet established a websocket connection to the Cserver, the Cserver must store the set of cumulative differences that have occurred since the visitor first sent the page. Often, such as in the case of the marquis, the page DOM changes many times. Where this occurs, the Cserver could end up with an arbitrarily long list of incremental changes to be applied. An agent joining the session would need to download this long list and apply it. This could perform poorly and could cause flashing in the agent view. It is common for the same page element to be changing in the same way each time, for example the "src" attribute of an <img> tag rotates among a series of images, leading to a succession of ATTR diffs for the same element. To prevent the accumulation of incremental DOM changes, the visitor JavaScript sends not only the most recent incremental change, but also the set of merged cumulative changes (a cumulative differential). If the same element has the same type of change applied to it, the newest change overrides the older change in the cumulative differential.

For example,

```
{
"diff":"ATTR",
"path":"#anelementid",
"data":{ "style":"color:red"}
}
```

Followed by:

```
{
"diff":"ATTR",
"path":"#anelementid",
"data":{ "style":"color:blue"}
}
```

Would be merged into a single cumulative diff:

```
{
"diff":"ATTR",
"path":"#anelementid",
"data":{ "style":"color:blue"}
}
```

In an embodiment where cumulative diffs are collected and consolidated at the visitor, when an agent views the page, the viewer retrieves and displays the initial page HTML. The viewer then retrieves the current set of cumulative differences via a websocket connection, and then applies those differences to the view. Any subsequent incremental differences are received via the websocket connection as they arrive from the visitor.

An alternative implementation could merge the incremental differences on the server side. That would eliminate the need for the visitor to upload the full set of cumulative differences with every DOM change, but would place greater load on the CServer.

DOM Tree Difference Algorithm

Figure 21:
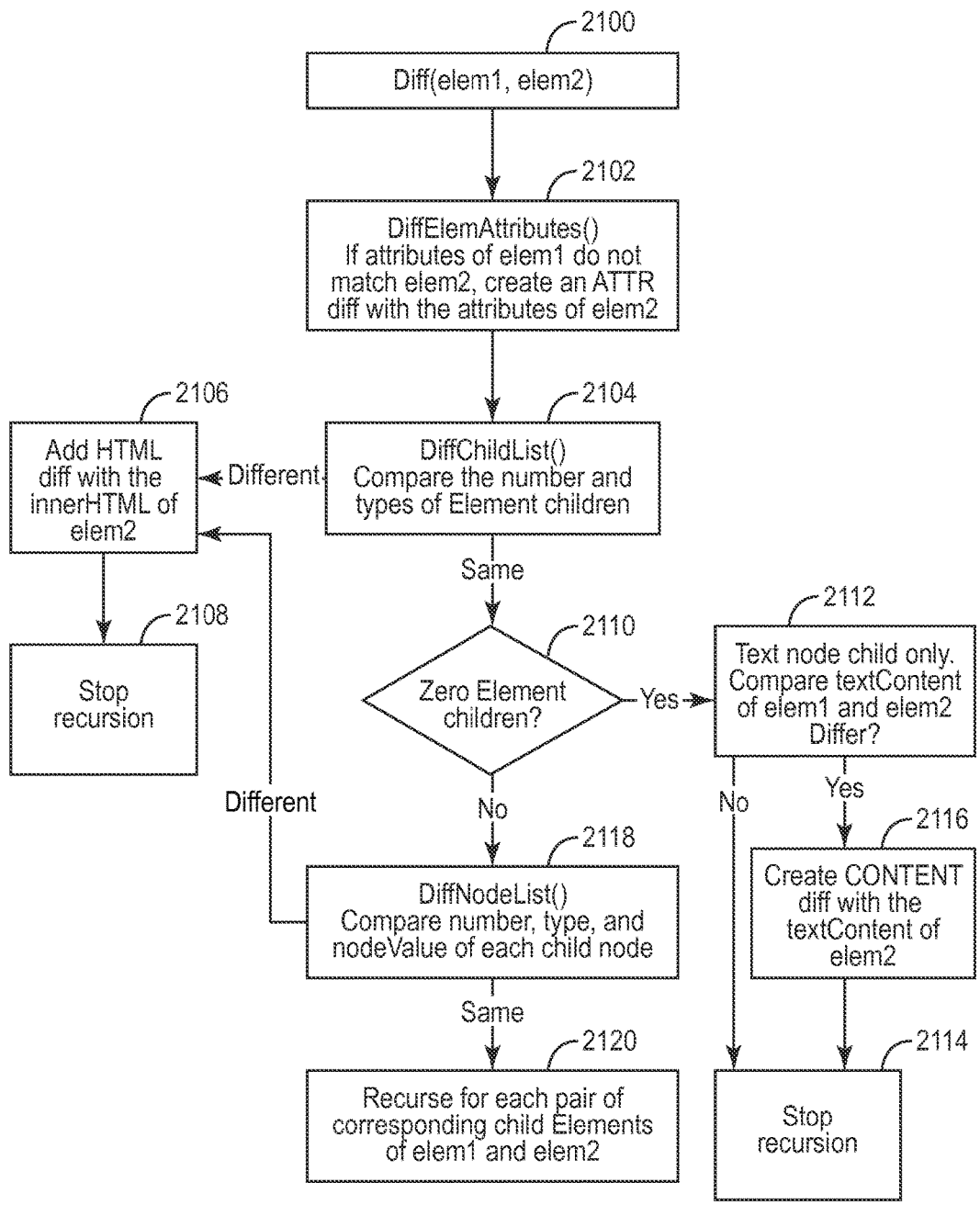
FIG. 21 is a flow chart showing an example process for determining incremental updates.

The visitor JavaScript stores a copy of the DOM tree each time it sends an update to the Cserver. When sending a new update, the visitor JavaScript compares the current DOM tree to the one sent with the previous update, calculating the set of ATTR, CONTENT, and HTML diffs. The comparison algorithm Diff(elem1, elem2) is shown in FIG. 21. Note that the Diff( ) algorithm shown in FIG. 21 is a recursive method initially called with the document element roots of the previous and current DOM tree as elem1 and elem2 respectively.

In an HTML document, HTML Elements can contain both element and text node children. Elements are nested HTML elements which may in turn contain other nodes or elements, while text node children contain spans of text. If an Element contains no other Elements (and just one or zero text nodes), a change in the text in the text node can be represented by a CONTENT diff. If an Element contains both elements and text nodes then changes to the text in any of the text nodes would be represented by an HTML change to the parent element.

As shown in FIG. 21, the comparison algorithm Diff (elem1, elem2) (2100) starts by determining if there is an ATTR diff by checking to determine if the attributes of element 1 do not match the attributes of element 2 (2102). If there is a difference in attributes, the algorithm creates an ATTR diff with the attributes of element 2.

The algorithm next compares the number and types of element children (2104). If the children are different, the algorithm will add an HTML diff with the inner HTML of element 2 (2106). At this point, the algorithm will have detected an HTML difference and accordingly it will stop the recursion (2108) and forward the updated HTML.

If the number and type of element children are determined to be the same in (2104), the algorithm will determine if there are zero element children (2110). If there are no element children, the node is a text only node. The algorithm will this compare the text content of element 1 with the text content of element 2 (2112). If the text of the two elements is the same, there is no difference between the two elements and the algorithm will stop the recursion (2114). If there is a difference between the two elements, the algorithm will create a CONTENTdiff with the text content of element 2 (2116).

If there is more than zero element children in (2110), the algorithm will compare the number, type, and nodeValue of each child node (2118). If these values are different, the algorithm will add an HTML diff with the inner HTML of element 2 (2106). At this point, the algorithm will have detected an HTML difference and accordingly it will stop the recursion (2108) and forward the updated HTML.

If the algorithm does not detect an HTML difference at (2118), it will recurse for each pair of corresponding child elements of element 1 and element 2 (2120) to look for changes in lower elements of the DOM tree. In this manner, the entire DOM tree will be recursed to look for incremental updates to the DOM which may be used to create updates for forwarding on the co-browse session.

iFrame Elements

A visitor web page may contain iframe elements which reference another page on the customer website. When the visitor Cobrowse.js renders the page as HTML, the iframe element will be rendered as <iframe src="iframurl/" I> The contents of the iframe page are not included. However, a separate copy of Cobrowse.js is included in the iframe source page just as with all other co-browseable pages on the customer website. When the iframe page loads, Cobrowse.js in the iframe uploads the iframe page data to the co-browse service as a "sub-session" of the main session. Mouse position, gestures, inputs, scroll position, mouse clicks etc. within the iframe are all uploaded to the Cserver as with the main session.

When uploading page HTML, the visitor substitutes the iframe src attribute with a URL to the iframe sub-session. On the agent side, the iframe will retrieve the sub-session view. The agent ifame view will also contain an additional copy of the agent viewer JavaScript CobrowseViewer.js, which will update the view continuously based on updates from the CServer.

Agent View

The agent meanwhile will log into the co-browse service, using a standard web browser, or possibly (for improved performance) a web browser enhanced with a plug-in or via some other means. The agent's browser requests the agent view of the customer's page. The page served to the agent contains an iframe with the same dimensions as the customer browser (as shown in FIG. 1). The iframe src URL retrieves a page composed by the co-browse service with the head and body HTML as sent by the customer, with a <script> tag referencing "cobrowseviewer.js" embedded in it. If the visitor has scrolled the page, the co-browse service inserts a <div> into the page which is offset from the top left of the page by the scroll offsets. The div has id "glance_scroll" and the iframe src url includes a relative portion "#glance_scroll", so that when the page loads in the frame it is immediately offset so that the <div> is in the top left of the frame. This approach results in the agent view immediately being positioned at the correct scroll offset without waiting for JavaScript on the page to scroll the agent's view.

Cobrowseviewer.js runs on the agent browser and operates to periodically retrieve incremental DOM changes, scroll offsets, mouse position, browser dimensions, element focus, select box state, and input field values from the co-browse service. The cobrowse service will also notify the agent if there is a full update available for the page HTML. Cobrowseviewer.js does the following:
1. If there is a full update to the page HTML, Cobrowseviewer.js refreshes the entire frame to get a new view with the current HTML. (alternatively, the page could rebuild itself using the updated head and body HTML)
2. Otherwise, cobrowseviewer.js:
a. Applies any incremental changes to the DOM
b. Scrolls the window (which is inside the iframe) to the same offsets as the customer's browser window;
c. Displays an image to represent the customer's mouse at the same coordinates as the customer's mouse cursor; and
d. Sets the values of the input fields to the specified values
e. If the agent's browser window is the active window on the desktop, sets focus to the visitor's focused element
f. If the visitor has a select box open, opens the same select box in the agent's view

Gesturing

In one embodiment, actions taken by the agent are captured by cobrowseviewer.js and passed to the co-browse service. The co-browse service, in turn, relays the captured input to the visitor to highlight aspects of the web site or to take other action in connection on the web site 14 displayed on the visitor's browser 10.

Figure 19:
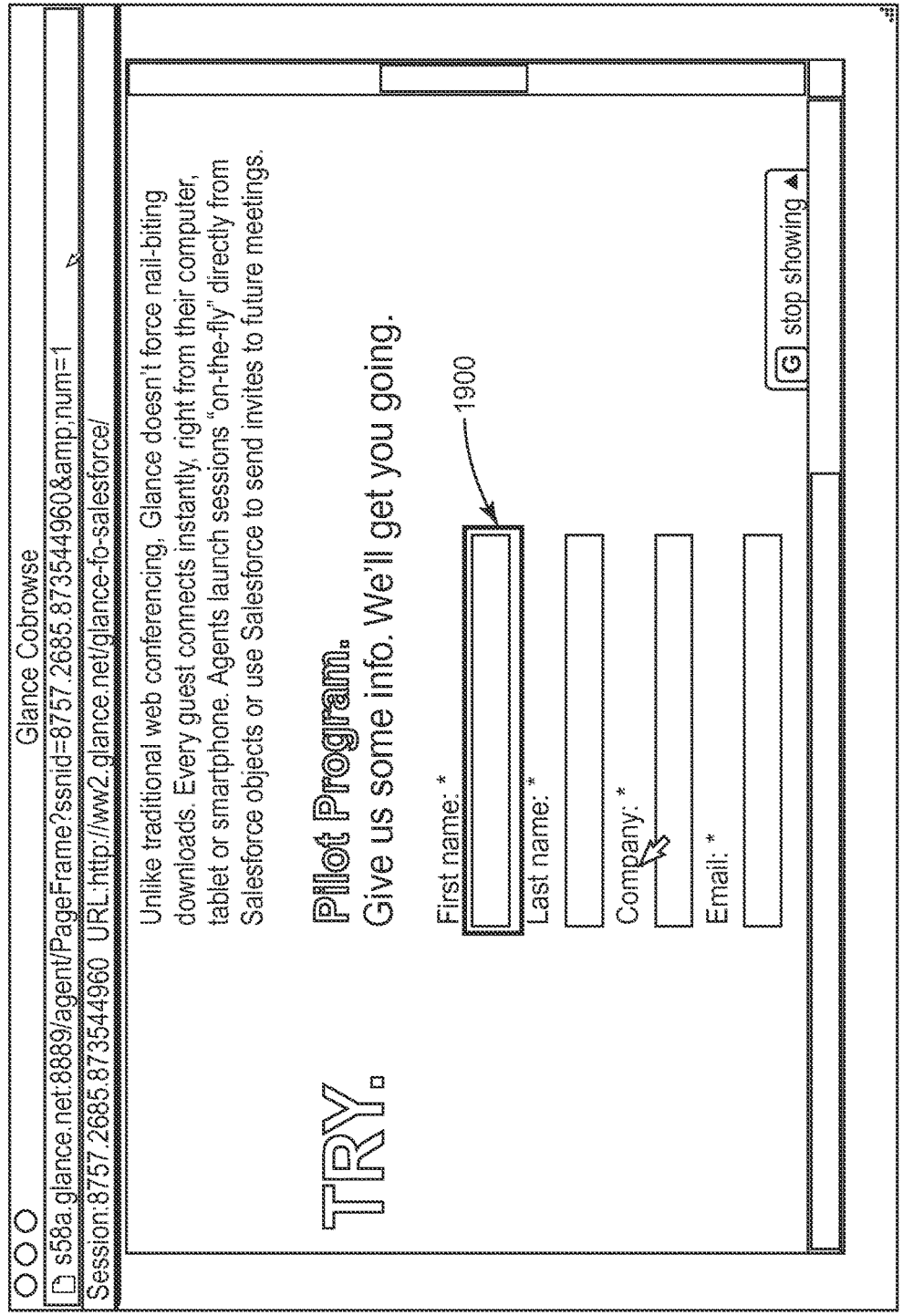
Figure 20:
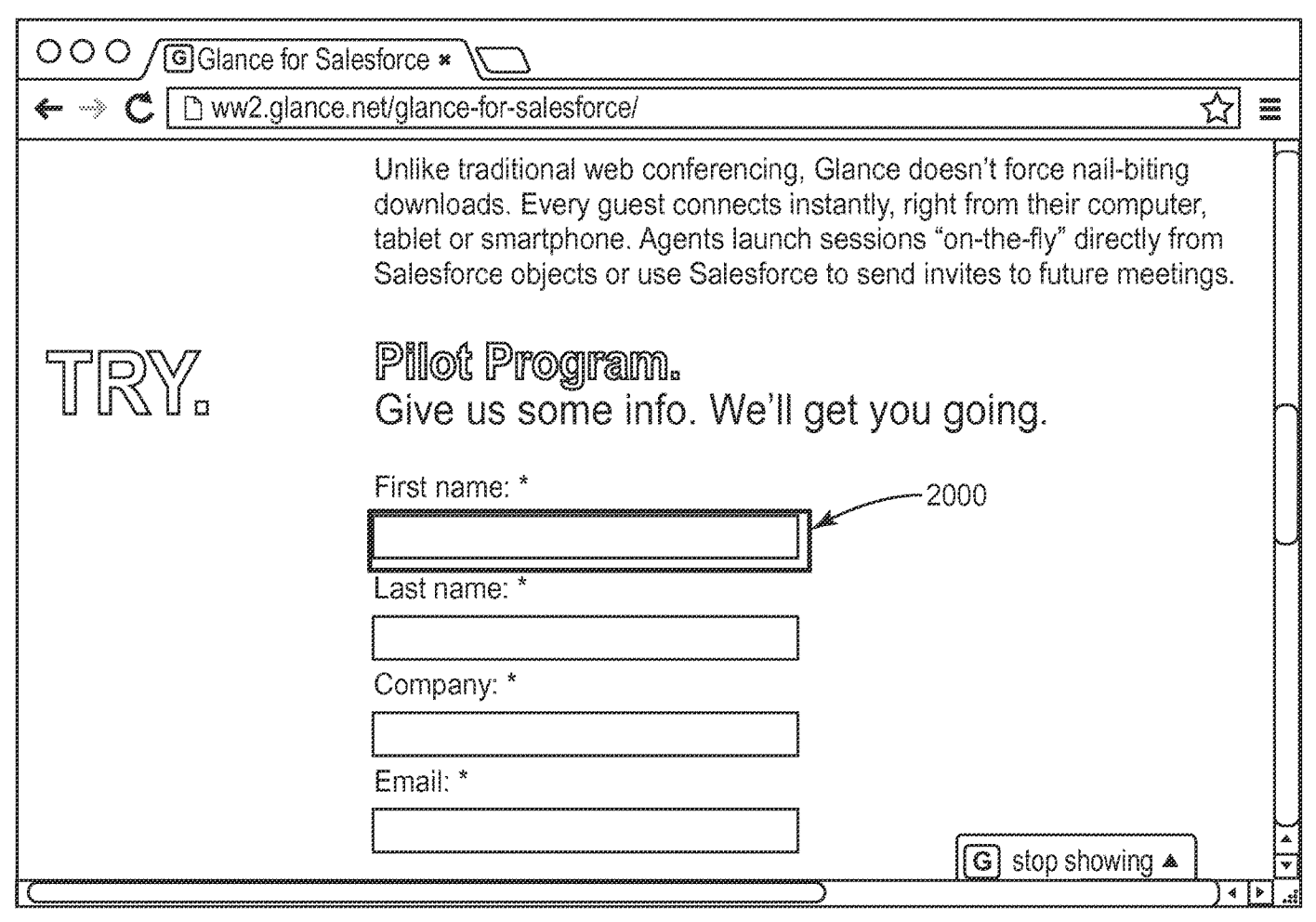

FIGS. 19-20 show an example of an embodiment in which, when an agent clicks on an element of the Agent's view of the website, a box is drawn around the corresponding element in agent's browser and in the visitor's browser 10. In the embodiment shown in FIGS. 19-20, FIG. 19 shows the Agent view. In this example, the Agent clicked on the blank field under "First name" which caused that field to be highlighted in the Agent's view. Specifically, this caused an orange rounded rectangle 1900 to appear encircling the element in the Agent's view.

FIG. 20 shows the visitor's view of the web site when the Agent clicked on the "First name" field. Specifically, as shown in FIG. 20, when the agent clicked on this object the service instructed the Visitor's view to draw a rectangle 2000 around the corresponding element in the visitor's browser. In one embodiment the rectangle drawn in the visitor's view is colored red. The rectangle change to the visitor DOM is not sent to the Cserver as an incremental update.

Although in this example a red box was drawn when the agent clicked on an element, other ways of visually drawing attention to elements may also be used. For example, different colors may be used for the boxes, or a solid semitransparent color may be superimposed over the element to highlight the element. Optionally, a semitransparent frame may be drawn around elements in the agent's view as the agent moves his/her cursor above the agent view so that the agent knows the dimensions of the element prior to selecting the element to be highlighted.

When an agent selects an element to highlight the element on the viewer's browser, the element may remain highlighted for an indefinite period of time on the visitor's browser. In this embodiment, if the agent clicks on another element, the highlighting will be removed from the first element and drawn around the second element. Alternatively, both elements may be highlighted. Likewise, if the agent clicks on a highlighted element a second time the highlighting may be removed from the element. Optionally, rather than having highlighting remain for an indefinite period of time, the highlighting may disappear or fade out after a period of time. For example, an agent may click on an element to cause the element to be highlighted to the visitor, and then the highlighting may disappear after a few seconds. The duration with which an element remains highlighted may depend on the number of times the agent clicks on the element, e.g. one click=3 seconds, two clicks=10 seconds, three clicks=indefinite. Many variations are possible depending on the particular implementation.

Agent gestures rely on the ability to unambiguously identify and access an element on a web page. In our implementation, when the agent clicks on an element to gesture, the JavaScript generates a CSS selector that uniquely identifies the element. The visitor side JavaScript is then able to access the element by CSS selector using standard JavaScript methods. Some elements on a web page have a unique id, and can be identified simply by a selector like "#someid". However many elements do not have an id and must be described by a path through the DOM. The following algorithm is used to generate a unique CSS selector: Walk up the element hierarchy, starting with the target element, getting a portion of the CSS selector either as an id or as an nth-of-type(n) selector at each level of the hierarchy. When done, the individual CSS selectors are combined with the CSS child> operator.

The algorithm to produce the ccs selector portion at each level is:
Get the id of the element (if it has one) and convert it to a valid CSS id by escaping certain characters or converting them to unicode escape sequences.
If the id uniquely identifies the element within its immediate parent, the CSS selector portion at this level is #theid.
If the id uniquely identifies the element within the entire document, quit. The element's id serves as a unique starting point for the path.
If the element is the document body, the CSS selector portion is simply "body". Quit; the body is the starting point for the path.
Otherwise, determine the index position n of this element within a list of its sibling elements of the same type. The CSS selector portion at this level is then tag:nth-of-type(n)

The following provide several examples of unique CSS selectors:
auniqueid
body>table:nth-of-type(1)>tbody:nth-of-type(1)>tr:nth-of-type(1)>td:nth-of-type(2)
content>div:nth-of-type(1)>form:nth-of-type(1)>table:nth-of-type(1)>tbody:nth-of-type(1)

The agent may also (with or without the visitor's permission) take remote control. In this mode, the agent's pointer position (which is distinct from the visitor's pointer) can be displayed to the visitor. The Agent can also type values into fields to input data into fields of the visitor's browser and click links, buttons, etc. Cobrowseviewer.js captures the key strokes and conveys the input to the visitor's browser. The visitor's browser captures the input in the relevant fields to enable the agent to input data into fields of the web site. This enables the agent to provide the customer with direct assistance in navigating the web site by enabling the agent to control the visitor's browser during the co-browsing session.

To prevent the agent from taking particular actions in the visitor's browser, in one embodiment a list of masked objects is defined for the web site which prevents the agent from entering data into specified forms, divs, pages, etc. Likewise the list of masked objects will prevent the agent from clicking on certain links or buttons, such as an "I agree" button on a click-through license agreement. Further, the agent is limited to the particular page and is not able to remotely control pages from other websites.

Reverse Co-Browse

In another scenario the agent may initiate a co-browsing session with a visitor. In this scenario, the agent may open a browser, navigate to a particular part of the web page, and then launch a co-browse session with a visitor. For example, a visitor is having trouble on a web page. The visitor contacts customer support. Rather than telling the visitor where to go, the agent locates the correct site, and launches a co-browse session (using cobrowse.js). The co-browse viewer JavaScript (cobrowseviewer.js) is passed through the chat to the visitor to cause a tab or new browser to open on the visitor which connects the visitor to the web site. The agent can then drive the browser or allow the visitor to control the browser.

Hover State

If a visitor allows their mouse pointer to remain above an element on a vendor webpage for a given period of time, the browser may interpret this action as "hovering". A web page may be designed such that different style attributes apply to the element depending on whether it is in a "hover" state. Some forms of hovering result in changes to the DOM, which will be reflected to the agent. For example, JavaScript "onmouseover" may be used to specify the type of effect that should be achieved upon hovering. When an "onmouseover" event occurs, for example to display a submenu, this causes a change to the DOM and the normal co-browse DOM update will reflect the change to the agent. However, other forms of hovering do not result in a DOM change. For example, CSS styles may be defined such that if the visitor's pointer hovers over the element, a menu of options related to the element will be displayed. This allows additional information to be provided dynamically within a page without requiring the visitor to click on links to move between pages.

A problem with this is that the hover state will not affect the DOM, and therefore the visual changes will not be reflected on the agent side simply by keeping the agent DOM synchronized with the visitor. Since the agent's actual mouse pointer cannot be positioned to match the visitor's mouse location, the same hover state does not occur on the agent side, and the agent will not see aspects of the web site that are shown based on the visitor's hover state. If the visitor side script modifies the document element hierarchy in the visitor's browser, changes to the hierarchy will be reflected to the agent via the co-browse service as described above. However, hover state does not change the hierarchy and hence will not be visible to the agent.

Thus, there are instances where the visitor will be provided with features of the web site via hover state events which the agent will not be able to see. This inability to see what the visitor is seeing may present a problem when the agent is trying to help the visitor through the web site.

According to an embodiment, an agent that is providing support for a vendor web site is provided with a list of hoverable elements, in the form of CSS selectors, for the web site. This list of hoverable elements can be defined once and used by all agents providing support for the vendor website. The list of hoverable elements may be created in many ways, similar to how the list of masked elements is defined. The list of hoverable elements is retrieved from the co-browse website along with the masked field definitions. To enable hover state to be replicated at the Agent, the mouse position of the visitor is monitored and used to selectively recreate the hover state at the agent side. One way of implementing this is described in greater detail below.

The look of a web site is defined using a style sheet. The style sheet defines styles that apply to both elements and classes of elements. One of the aspects that can be defined is to define hover state for an element/class—i.e. what happens if a visitor hovers their cursor over the element. For example, a web site may specify that a second level menu appears when a user hovers on a first level menu tab, e.g. using the following code set forth below in Table 1:

TABLE I

.navbar .level1item:hover .level2menu {
display:block;
}

The agent's host machine actual mouse position does not follow the visitor mouse. Accordingly, the agent browser does not detect the "hover" state, so the second level menus do not display on the agent side. There are several ways to fix this problem for the agent. For example, for the element under the cursor itself the visitor JavaScript could call getComputedStyle( ) and send it over to the agent's browser, then have the agent apply that computed style to the same element on the agent side. But that would not work in the case of nested hovered elements unless getComputedStyle was called not only for the element under the cursor but also all elements it contains.

There are two configuration pieces that need to be in place for a customer whose website relies on: hover styles: 1) a list of "hoverable" elements, and 2) a set of agent CSS styles to be applied to the agent view only. For example, a tool may be created to scan the website style sheets and generate the list of elements which are hoverable on the web site.

A hoverable element is one which has a style that applies to it (or to one of its siblings or children) when the mouse is hovered over it. Hoverable elements may be specified by any valid CSS selector, often tagname and ID or class. Hoverable elements can be defined on a per customer basis. Table II shows an example of how website style definitions for hoverable elements may be specified:

TABLE II for example, the following style definitions:
div1:hover
{
/* this style definition applies to any element with id "div1" whenever the mouse hovers over the
element div1 */
}
div2: hover .c2
{
/* this style definition applies to an element with CSS class c2 that is a descendent of an element
with id div2, whenever the mouse hovers over div2 */
}
.c1:hover
{
/* this style definition applies to any element with CSS class c1 whenever the mouse hovers over
that element */
}
h1.c3:hover p
{
/* this style definition applies to any <p> elements that are descendents of an <h1> element with
CSS style c3, but only when the mouse is hovered over the h1 element */
}

The "hoverables" in this example, would be
div1
div2
.c1
h1.c3

The corresponding agent styles that are included in the agent style sheet are shown below in Table III:

TABLE III

.div1__hover
{

TABLE III-continued

/* style definition matches #div1 :hover */
}
.div2__hover .c2
{
/*style definition matches #div2:hover .c2 */
}
.c1__hover
{
.../*style definition matches .c1:hover */
}
h1.c3__hover p
{
.../* style definition matches h1.c3:hover p */
}

To enable hover state to be replicated at the agent, the JavaScript at the visitor side looks at the mouse position on the visitor side and checks to see whether the mouse position is located over any "hoverable" elements. If so, the agent needs to apply one (or more) of the hover styles to the corresponding element on the agent view. The visitor JavaScript sends a list of styles for the agent to apply. Each entry in this list consists of:

csspath: CSS path to the element that is hovered over. The CSS path is specified using the algorithm described above.

classname: the name of the style to apply to the hovered element. The style name is generated based on the CSS selector that identified the element. In the example above, if an element matching selector #div1 is hovered, then the style name would be "div1_hover". If an element matching selector .c1 is hovered, then the style name would be c1_hover. For some websites this technique might be insufficient and we might need to extend this naming convention or allow admins to specify the style name that should be associated with a particular selector.

The agent iterates through this list, finding each element identified by the csspath, and applying the specified classname to it, resulting in the same visual effect as the :hover state style that was applied on the visitor side.

When the visitor hovers over an element, that action is detected and a command is forwarded to the agent to inform the agent that a hover state has been triggered. By passing a list of hoverable "CSS selectors" to visitor, and having the visitor browser determine if anything that is hovered over matches a selector, it is possible to have the JavaScript pass instructions to the agent to enable the agent to recreate the hover state at the agent side.

Co-Browse Service

The Co-browse Service allows one or more customer service agents to view, in real time, the web browsing activity of visitors to a website. Other uses of the co-browse service may be developed as well, and indeed the co-browse service may be used in any situation where a person would like to view, in real time, the web browsing activity of a visitor to a particular web site. Accordingly, although an example will be provided in which an agent is able to see what the visitor is seeing, the invention is not limited to this particular use.

In the embodiment described herein, agents see exactly what visitors see in their browsers, with the exception of the content of designated masked fields, such as a credit card number or password. Likewise, dynamic content such as advertisements, which are served from other web sites (content from web sites other than the vendor website) will be visible to the agent, but the agent may not get the same ad as the visitor.

The co-browse service implements, in one embodiment, several mechanisms that enable security and enhance integrity of co-browse sessions. The co-browse website has security measures in place, e.g. login and account management systems, which enables the website itself to be secure against attack.

Architectural Overview

Figure 2:
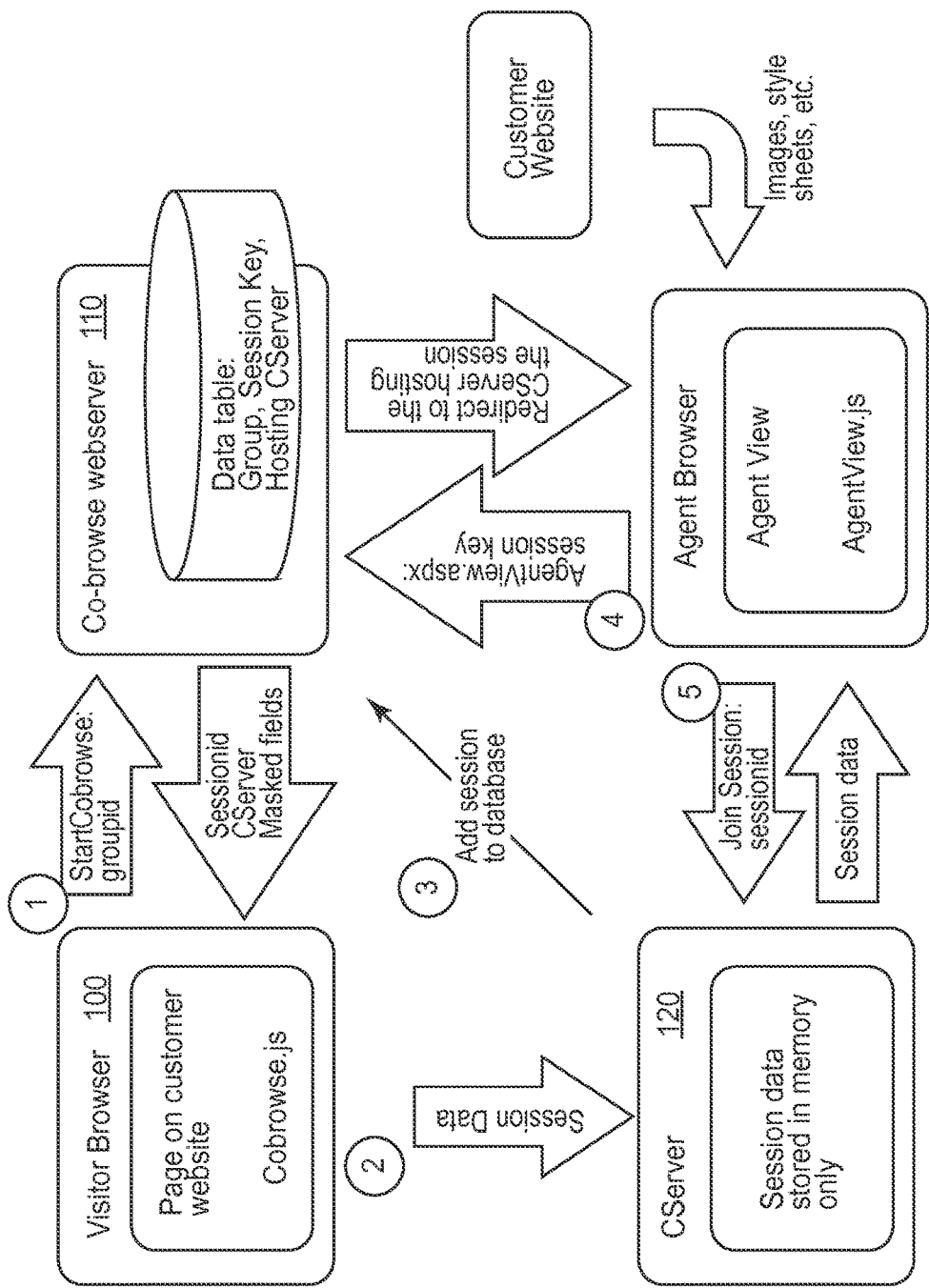

FIG. 2 shows an example architectural overview of an example co-browse service. The Co-browse service relies on a <script> tag embedded in the customer website which references a JavaScript file hosted by the co-browse webserver. For the purposes of this document, this visitor side JavaScript file will be referred to as Cobrowse.js. Other names for the JavaScript may be used as well.

When a co-browse session starts, Cobrowse.js sends a StartCobrowse request to the co-browse webserver (Arrow 1 in FIG. 2). Cobrowse.js passes the customer group id from the visitor 100 to the co-browse webserver 110, and receives a unique session id, a CServer assignment, and the list of masked fields and hoverable selectors.

The session id, in one embodiment, includes three components: 1) the customer group id 2) a session key and 3) a random number for uniqueness. Other parameters may be passed as well depending on the embodiment.

Cobrowse.js stores the session id and the set of masked fields in a browser session cookie, and proceeds to start uploading session data to the designated CServer 120 (Arrow 2 in FIG. 2). The CServer in turn posts a message (Arrow 3 in FIG. 2) to the co-browse webserver to record in the database the fact that the session has started.

Both group id and session key are required to join a session. Once logged in, the group id can be determined based on the agent's co-browse group membership. For example, the agent will provide support for one or more customer websites. The JavaScript that is downloaded to the visitor when the visitor is at the customer website contains the group id for the customer, which the customer uploads to the co-browse webserver (arrow 1) when the session is started. This enables the co-browse webserver to know which customer is associated with a particular co-browse session. Where the agent is supporting multiple customers, the agent can provide the group ID of the customer to the co-browse server to select co-browse sessions associated with one of the supported customers (arrow 4, FIG. 2).

As for the session key, there are several ways it might be specified on the agent side. The session key might be a randomly assigned string, or might be some piece of information associated with the visitor, such as a user id or a tracking cookie id. The agent might enter the session key manually, or it might be extracted automatically for the agent from data in a CRM record. Additional details of example connection scenarios are set forth below.

Either way, the result is that the agent opens a browser window to a URL associated with the co-browse session, e.g.:

https://www.cobrowse.net/cobrowse/
AgentView.aspx?SessionKey=ssnkey

If not logged in, the agent is prompted to log in and is then redirected back to the agent view.

AgentView.aspx looks up the session in the database by agent group id and session key, and redirects the agent to the appropriate CServer, which generates the agent view of the session. The agent view includes an embedded JavaScript file, CobrowseViewer.js, which communicates with the CServer via both HTTP and websockets (arrow 5, FIG. 2).

The CServer sends only HTML markup for the browsing session to the agent browser. Resources referenced by the session HTML, such as images or style sheets, are downloaded by the agent directly from the customer (or third party) website.

Security Considerations

The co-browse service collects and transmits potentially sensitive visitor browsing information, and has therefore been designed with security as the highest priority. The following security considerations are addressed by the co-browse architecture:

Secure Agent View

When an agent attempts to join a session, the webserver looks up the session based on the agent's co-browse group and the supplied session key. If a matching session is found, the webserver returns the session id, signed using a secret "server key". The server key is a 256 bit number that is known only to the CServer and webserver; a new server key is generated by the CServer every 60 seconds and shared securely with the webserver. When the agent is redirected to the CServer to view the session, the CServer verifies the signature on the session id and only allows the agent to join if the signature is valid. This approach guarantees that a request to view a session is only granted if a) the agent authenticated at the webserver and b) is a member of the group that the session is associated with.

Once the agent has joined the session, a secure (flagged for HTTPS only) session cookie is used to maintain the agent's session. The agent session cookie contains the session id signed using a secret key known only to the CServer. The CServer secret key is generated at runtime and does not persist anywhere.

Websocket connections from the agent also pass the agent session cookie value when the connection is first established. The CServer only accepts websocket connections to a given session if the request includes a valid agent session cookie value.

No browsing session data is ever served by the CServer without a valid agent session cookie attached to the request. This guarantees that only agents who have a registered co-browse provider account with a particular company are able to view sessions started by visitors to that company's website.

Secure Data Transmission

Using HTTPS or secure websockets for all communication ensures that all data is transmitted securely, to servers whose identity has been verified. This includes:

Downloading the co-browse JavaScript from the co-browse webserver to the visitor browser Communication between cobrowse.js and the co-browse webserver Communication between cobrowse.js and the CServer Communication between the CServer and the co-browse webserver Downloading session data and the agent JavaScript to the agent's browser Communication between AgentView.js and the CServer (if the visitor page is secure)

Downloading visitor session resources from the customer website to the agent browser (if the visitor page is secure)

JavaScript Integrity

Visitor JavaScript is downloaded from the co-browse webserver to the customer site (where the customer is serving JavaScript to visitors) using HTTPS from the co-browse webserver. HTTPS ensures that the script itself comes from a legitimate source. It is the customer's responsibility to ensure that the co-browse JavaScript is embedded with HTTPS into their website, even for non-secure pages. To encourage this, the co-browse webserver will not serve the visitor side JavaScript over HTTP, so that any attempt to access the JavaScript via HTTP should be detected during testing.

Masked Fields

Masked field definitions cannot be tampered with, as they are stored in the co-browse webserver's secure database and retrieved over a secure connection to the co-browse webserver. Alternatively, the masked field definitions may be stored by customers and provided by customers to visitors as noted above. The contents of masked fields never leave visitor's browser, so that there is no possibility of this data being intercepted in transit, or accessed from the CServer even by an agent with a legitimate session cookie.

Masked Objects

Masked object definitions cannot be tampered with, as they are stored in the co-browse webserver's secure database and retrieved over a secure connection to the co-browse webserver. Alternatively, the masked object definitions may be stored by customers and provided by customers to visitors as noted above. Agents are prevented from providing input to masked objects to thus prevent the agents from controlling aspects of the visitor's browser included in the list of masked objects. Alternatively, a list of controllable objects may be used to specify those objects within the visitor's browser the agent is able to control such that, by default, an object not included within the list of controllable objects is automatically treated as a masked object and not able to receive input from the agent.

Secured CServer

Each co-browse server 120 is a standalone Unix server running its own local firewall. The firewall is configured to allow incoming traffic only on secure port 443. No session data persists in any file or database on the CServer. Although FIG. 2 shows the co-browse webserver implemented separate from the co-browse server 120, other implementations may incorporate aspects of the functionality of the co-browse webserver 110 with the co-browse server 120.

No Per-Agent Restrictions

Note that there is no specific protection against one agent viewing a session that might have been intended for another agent, as long as both agents have accounts in the same group. Even when a random session key is exchanged privately over the phone between visitor and agent, the key is not protected from snooping because it is stored in an insecure cookie that will be uploaded unencrypted if the visitor navigates to an insecure page on the customer website. In another embodiment, further restrictions on which agent is able to view a co-browsing session may be implemented.

Agent Http for Websites Using a Content Delivery Network

If the agent session strictly uses HTTPS to access visitor session data, the agent browser will request all resources such as images and style sheets using HTTPS. Some website implementations, particularly if using a content delivery network, cannot deliver all resources over HTTPS.

To work around this, the co-browse service can optionally be configured to allow the agent protocol to follow the visitor protocol, so that when the visitor navigates to an HTTP page, so does the agent, and vice versa. Two separate session cookies are maintained on the agent side, a secure cookie for viewing HTTPS pages, and a non-secure cookie for viewing HTTP pages. While the non-secure cookie provides a minimum level of security, the agent session is not protected from traffic sniffing. Alternatively, a proxy service may be used to enable the agent to view what the visitor is viewing in this situation.

Co-Browse Connection Scenarios

There are numerous ways for the agent to connect to the correct co-browse session. A given web site may have hundreds or thousands of visitors at any one point in time. If the co-browse JavaScript is downloaded in connection with loading the web page, a co-browse session will exist for each of these visitors. A given agent, who is working with a particular visitor, will need to select the correct co-browse session to enable the agent to see the state of the web site as experienced by their particular customer.

Accordingly, it is necessary for the agent to identify the visitor and correctly identify which co-browse session is associated with the identified visitor. The particular mechanism that the agent can use to do this will depend on the particular implementation of the web site as well as what other types of software (e.g. CRM software) are being used by the Agent.

The agent may be interacting with the customer using a chat service provided by a third party or, optionally, also being provided by the co-browse service. Likewise the agent may have customer relationship management software running on their workstation that the agent can use to keep track of clients and other contacts. To facilitate interaction between the agent and visitor, it often may be advantageous to leverage these other contacts with the visitor to help identify the co-browse session on the co-browse service that is associated with the customer with which the agent is engaged.

FIGS. 3A-3B show an example of how a Co-browse session may be initiated when the visitor needs help (or the agent or automation rules perceive the visitor may need assistance). In the example shown in FIGS. 3A-3B, the agent and visitor are talking together on a voice call or are engaged in a chat, and the website has a button 300 that will enable the visitor to initiate a co-browse session. Specifically, if the visitor clicks on button 300 to initiate a session (FIG. 3A) a popup 310 will supply a random session ID 315 to the visitor (either numeric or alphanumeric). Visitor verbally gives number to agent on call or types the numbers into the chat. The agent then provides the number to the co-browse webserver which enables the co-browse webserver to connect the agent to the correct co-browse session.

FIG. 4 shows an alternative to a slider or tab, in which a discreet button 400 is placed on a website and used by the visitor to launch a co-browse session. The visitor could click button 400 for help or the agent could direct the visitor to find the button and click it. Clicking on the button would start the co-browse session and show a popup 500 as shown in FIG. 5. Popup 500 is the same as or similar to popup 310 shown in FIG. 3. The visitor can then text the code to the agent or tell the agent the code. The code can be generated by the co-browse service or generated in the Visitor's browser. In either case it is associated with the session and needs to be communicated from the visitor to the agent, unless there is another identifier available on both visitor and agent side.

Figure 6:
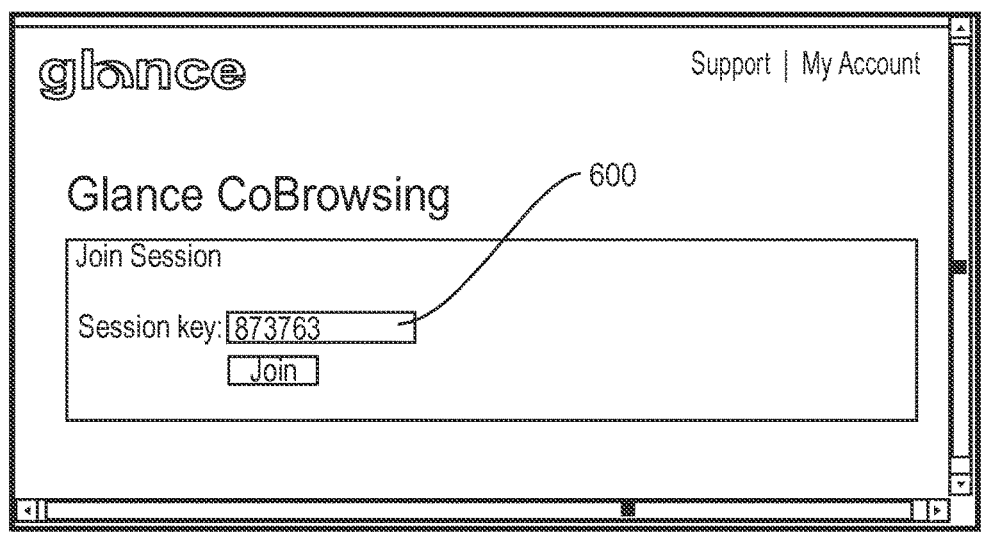

FIG. 6 shows the agent screen when an agent joins a co-browsing session through an interface provided by the co-browsing service. As shown in FIG. 6, when the agent would like to join a co-browsing session, the agent will click on an icon on their computer which will show the popup shown in FIG. 6. The agent then types the number provided by the visitor (see FIGS. 3B & 5) to join the session. As shown in FIG. 6, the popup includes field 600 in which the agent can type the session key to enable the agent to join the co-browse session with the visitor.

Figure 7:
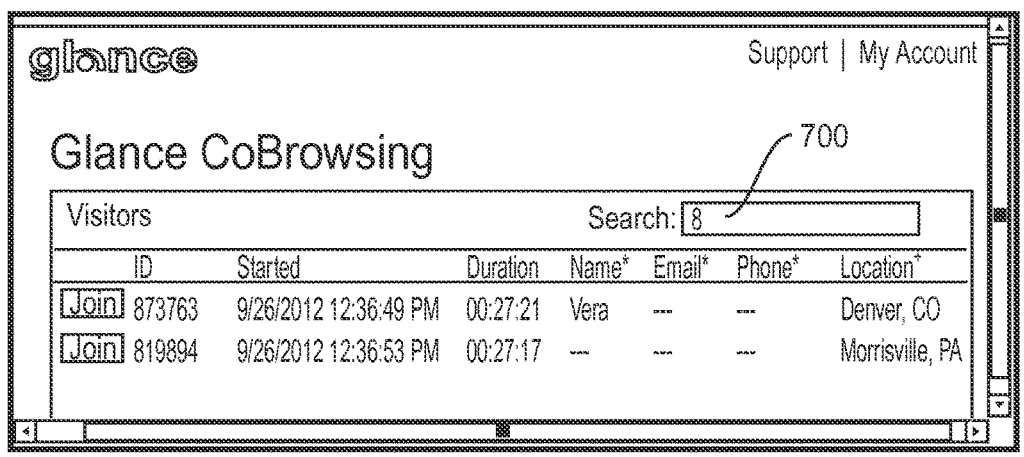

FIG. 7 shows an alternative to typing the number into a popup. Specifically, in FIG. 7 the co-browse service interface provides a list of co-browse sessions to the agent (to which this agent has access, by virtue of permissions, skill-set or some other criteria) which the agent may join. The agent selects the co-browse session from the list or types the session key or other information into a search field 700 to more quickly locate the correct co-browse session from a set of available co-browse sessions.

Figure 8:
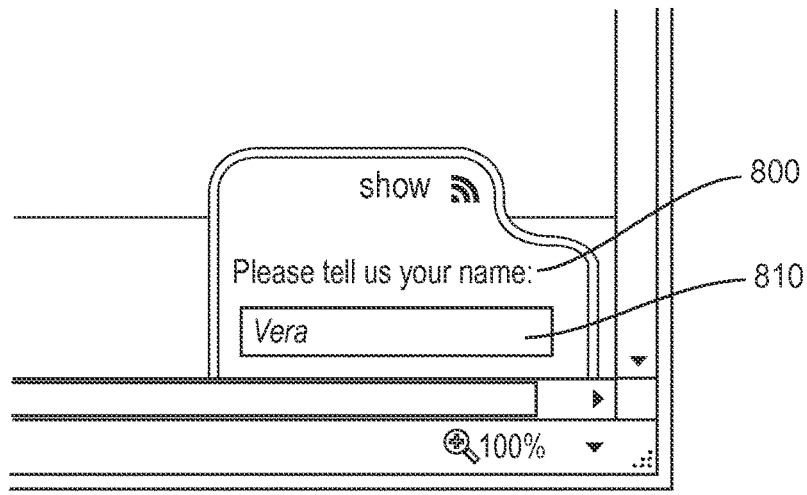

Instead of providing an identifier to the visitor and then requiring the visitor to provide the identifier to the agent, in another embodiment the visitor is prompted to input identifying information that can be used by the agent to find the visitor's co-browse session. For example, as shown in FIG. 8, when the visitor clicks on a tab to initiate a co-browse session the tab may provide a prompt 800 instructing the visitor to enter the identifying information and a field 810 in which the visitor is able to input the identifying information. The agent asks the visitor their name and uses the name to select a session by typing the visitor's name into box similar to box 600 (see FIG. 6) or to search for a co-browse session from a list of current sessions (see FIG. 7). Although the example shown in FIG. 8 requested the user to enter their name, other customer information may be used instead, such as the customer's location, account ID, email address, or other information available in the context of the visitor web session.

Figure 9:
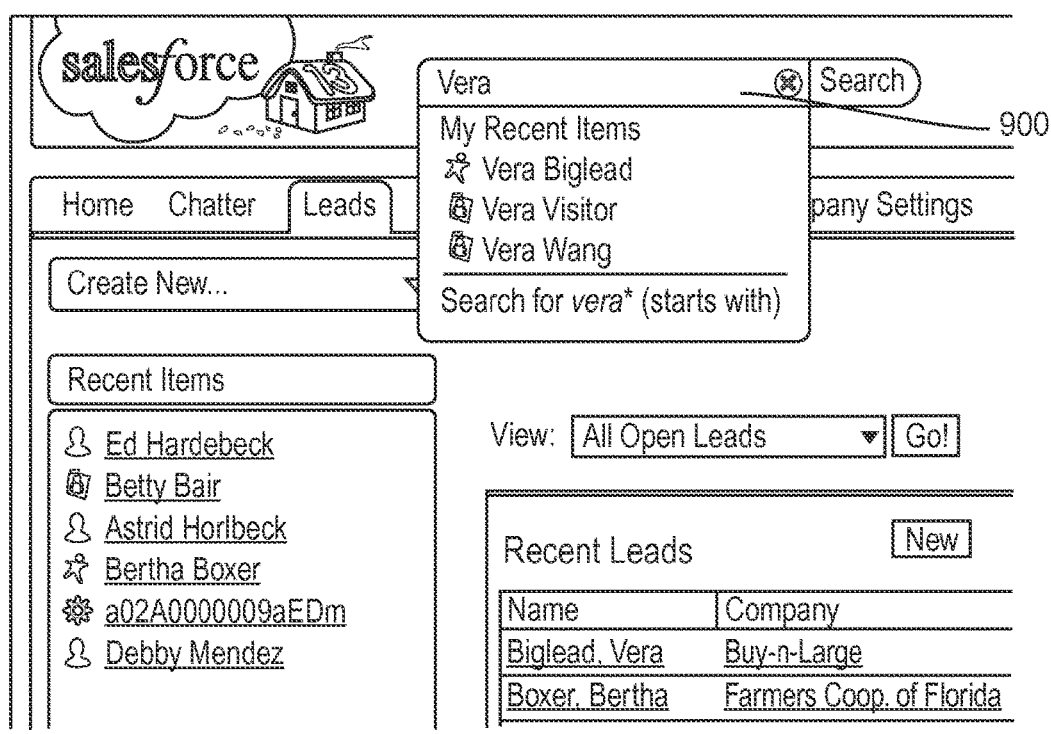

An agent may be running customer relationship management (CRM) software such as CRM software available from SalesForce™. The agent may use the CRM software to locate co-browse sessions as well. FIG. 9 shows a screenshot of a portion of a CRM software interface. As shown in FIG. 9, the agent can find a lead or contact manually within the CRM system using information provided by the visitor. Alternatively, when the visitor enters information into field 810, if a record exists for the visitor in the CRM system, the lead/contact screen/page could alert the agent that the lead/contact is in-site and/or requesting help.

FIG. 9 shows an example CRM software interface when the agent types in a visitor name. Specifically, in this figure, the agent will request the visitor's name and then type the visitor's name in search field 900. As shown in FIG. 10, the CRM software will populate a list 1000 of contacts and/or leads which match the search. The agent can select one of the entries from this list (e.g. Vera Visitor) to pull the contact record for the visitor within the CRM system.

Figure 11:
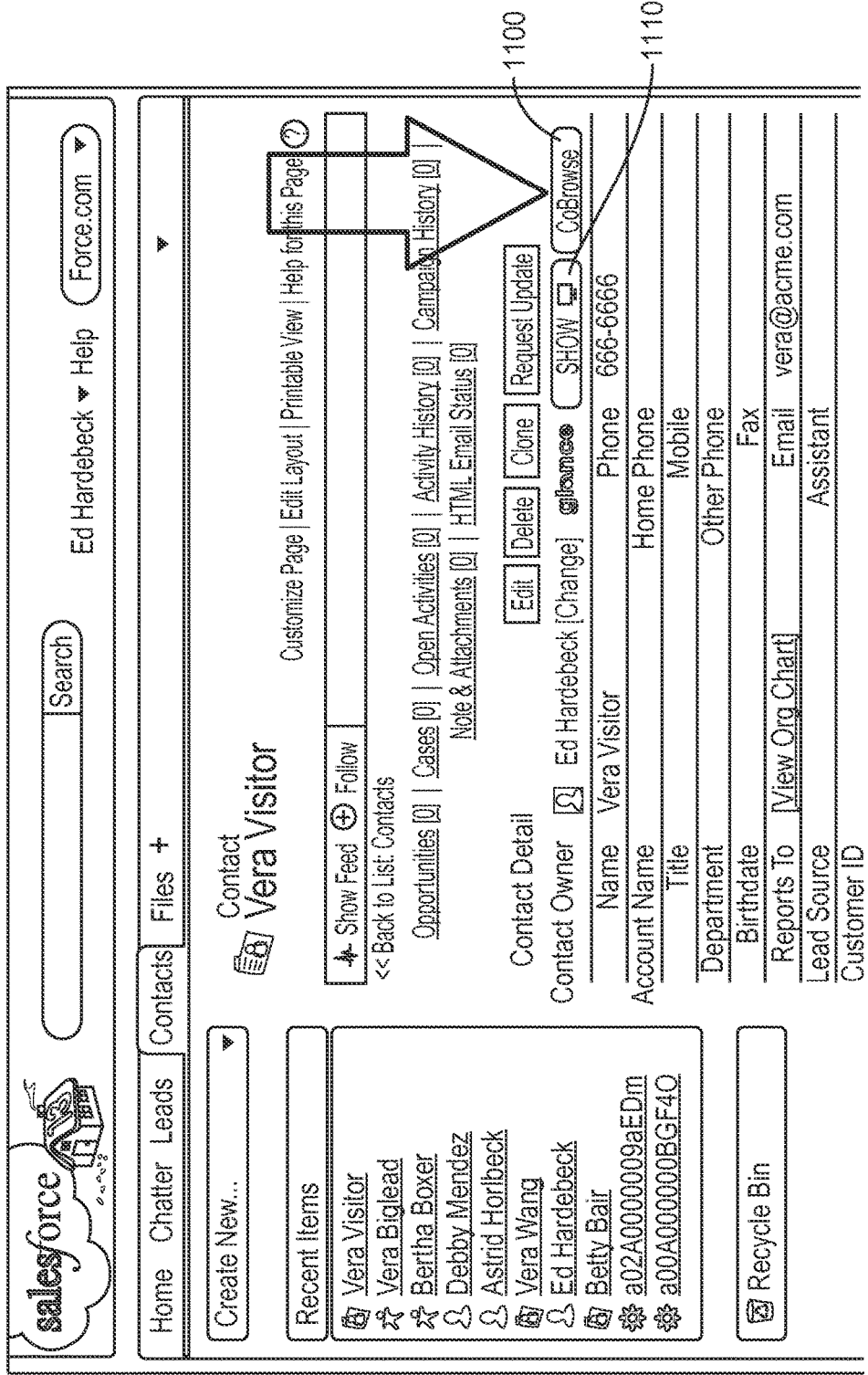

FIG. 11 shows an example contact record for the selected visitor. As shown in FIG. 11, the contact record includes a button 1100 that the agent can click to join the co-browse session with the visitor. A screen sharing button 1110 is also provided to enable the agent to engage the visitor using a screen sharing session to enable the agent to show information back to the visitor. Joining the co-browsing session through the CRM record enables the CRM system to keep track of co-browsing sessions within the context of other contact data, to enable analytics to be built from the co-browsing session information.

Optionally, the CRM system may automatically create a new contact record or other CRM record for new visitors. An implementation of integration between a CRM system and screen sharing system is described in greater detail in U.S. patent Ser. No. 13/624,951, filed Sep. 23, 2012, entitled "Integrating Screen Sharing Sessions with Customer Relationship Management", the content of which is hereby incorporated by reference. In this referenced patent, a mechanism is used to enable the CRM system to detect initiation of screen sharing sessions and poll a screen sharing service for information about the screen sharing session, such as the duration of the screen sharing session and information about the participants to the screen sharing session. A similar mechanism may be used to enable the CRM system to capture co-browsing session. Specifically, the CRM system may determine that an agent has elected to participate in a co-browsing session. At a later time the CRM system may poll the co-browsing server to obtain details about the co-browsing session, such as the duration of the co-browsing session, the participants to the co-browsing session, the pages visited during the co-browsing session, and any other information available to the co-browsing service. Likewise, the co-browsing session may be recorded for training purposes as well as for auditing.

FIG. 12 shows another example, in which the CRM software have a separate tab showing a list of visitors on the site. In this example, the CRM system pulls information and additional fields from CRM records, and presents available co-browse sessions in list format. The list may be optimized, for example, by highlighting visitors that are requesting help and/or sorting these visitors to the top. For example, as shown in FIG. 12, a list 1200 of visitors in the site is provided. One of the visitors 1202 is listed as anonymous because the CRM system does not have any information about that visitor and/or the visitor has not provided identifying information to the site.

Some web sites provide chat (text based) customer support. It is customary for the visitor to be asked to provide identifying information in connection with starting a chat session. The initial information gathering which takes place in connection with starting a chat will be referred to herein as a pre-chat survey.

Figures 13A, 13B:

The particular manner in which a co-browse session may be identified and linked to a chat session depends on the level of integration between the co-browse service and chat service. If there is integration between the chat and co-browse services, the information from the pre-chat survey may be used to perform a lookup for a matching co-browse session. FIGS. 13A and 13B show example pre-chat survey windows that may be used to collect information from a visitor when the visitor elects to engage customer service via a chat session.

Figure 14B:
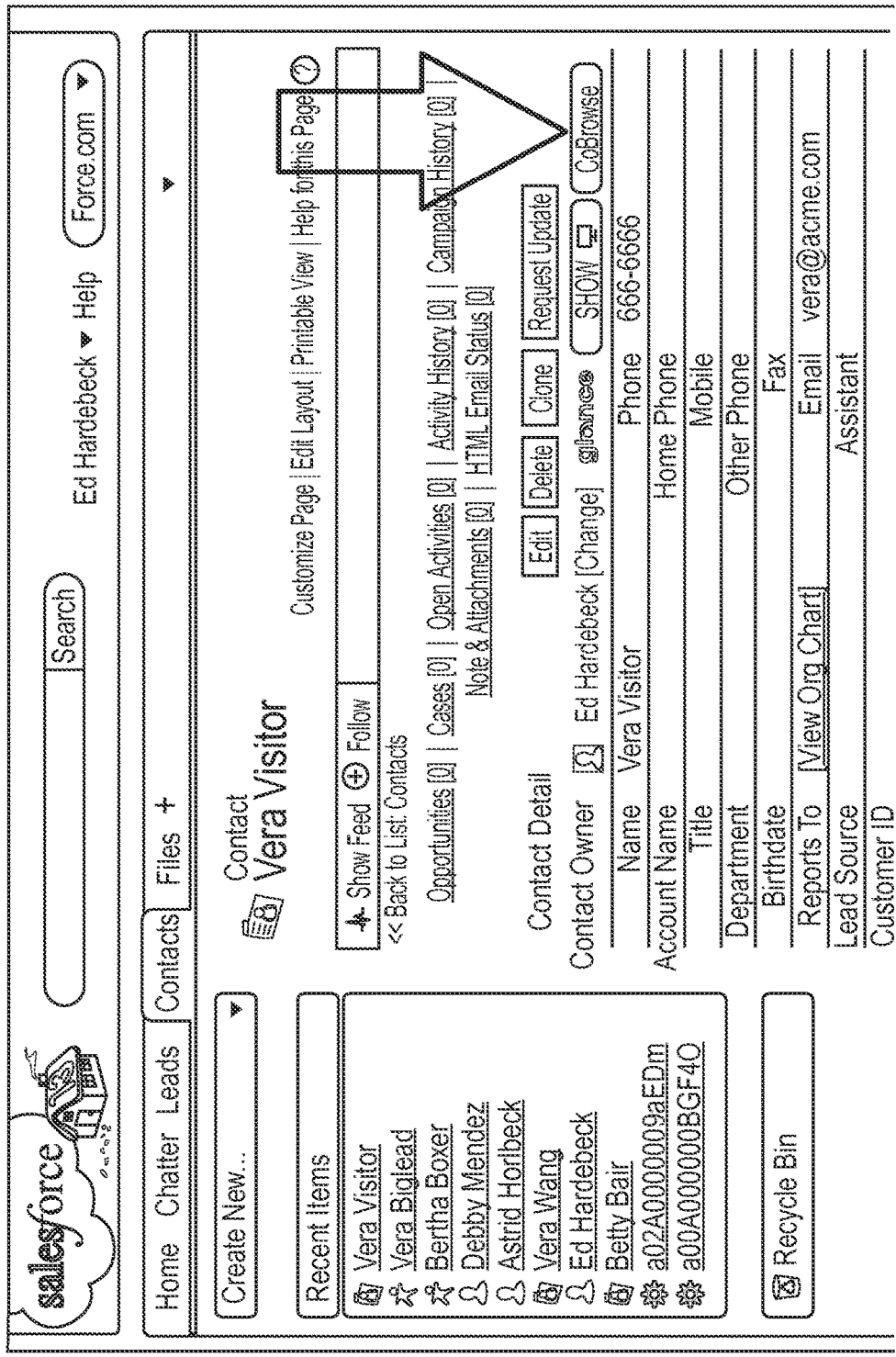

As shown in FIGS. 14A and 14B, the agent will see the visitor information in the chat application and may use the visitor information to look for a co-browse session using the mechanisms described above in connection with FIGS. 9-12. If the visitor's name or other identifying information is not collected using a pre-chat survey, this information may be collected by the agent during the chat session and used to locate a co-browse session associated with the visitor.

Figures 15A, 15B:
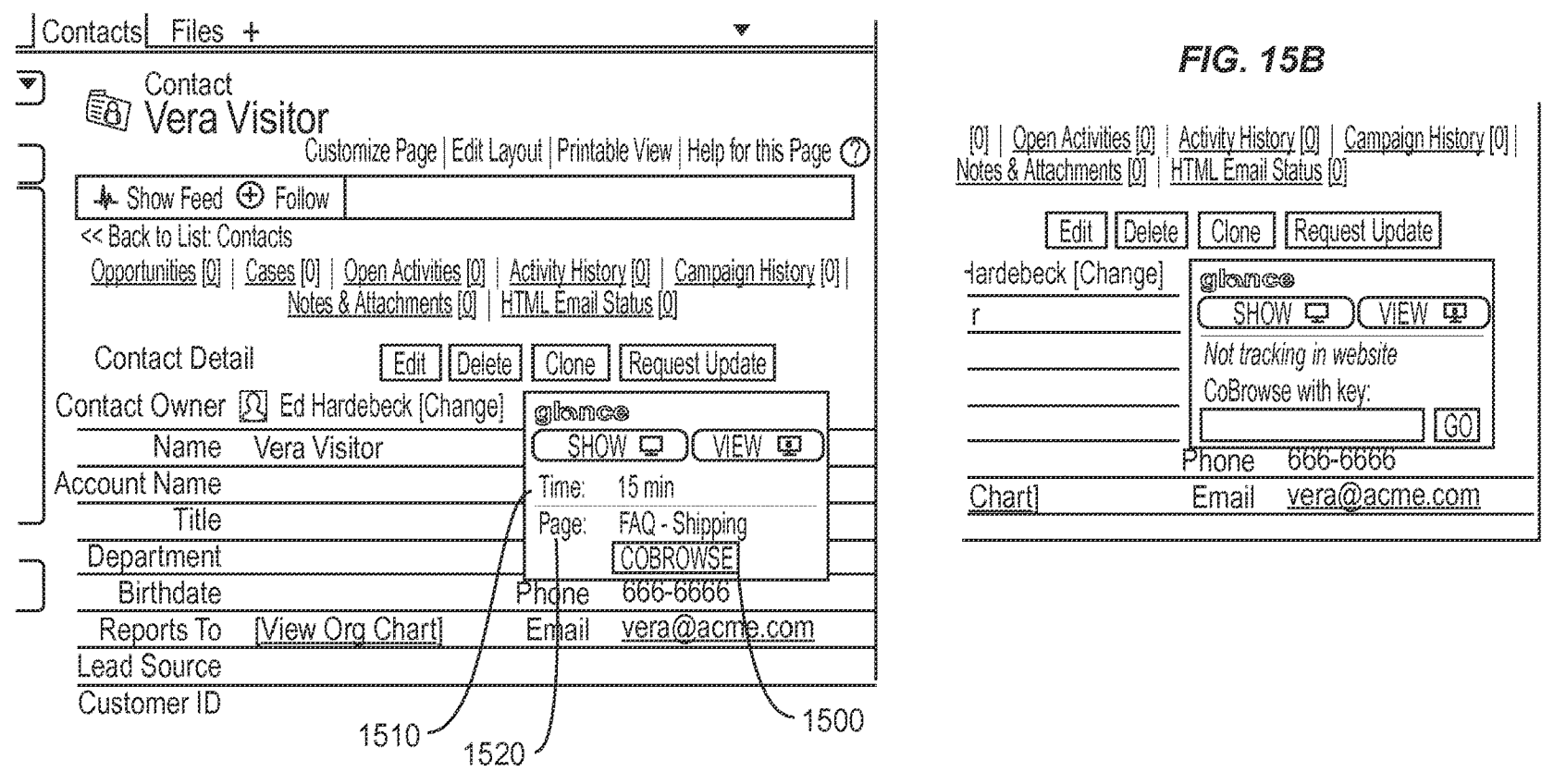

FIGS. 15A and 15B show example CRM interfaces that may be used if the chat and CRM systems are integrated with the co-browse service. As shown in FIG. 15A, the contact record for the visitor may be automatically displayed when the agent is in a chat session with the visitor. The CRM record, in this embodiment, includes a co-browse button 1500 that the agent can use to connect to a co-browse session associated with the visitor. FIG. 15 also shows the agent status information about the visitor, such as the amount of time the visitor has been on the site 1510 and the page where the visitor is located on the site 1520. This allows the agent to have an idea of where in a transaction the visitor is located, so that the agent has a better understanding of what issues the visitor is likely to be encountering.

FIG. 15B shows the agent screen when the visitor is not being tracked in the website by the CRM system. As shown in FIG. 15B, if the agent would like to join a co-browsing session with the visitor, the agent may be prompted to enter identifying information such as the co-browsing key (see FIG. 3B), visitor's name, etc.

FIG. 16 shows a scenario where there is no integration between the CRM system and the chat system, but the CRM system does have knowledge of available co-browse sessions. As shown in FIG. 16, the agent can use the information provided in the pre-chat survey or other information obtained during the chat session to look up a contact record for the visitor in the CRM system. In the example shown in FIG. 16, the visitor's location (Denver) was used to search the list of existing co-browse sessions. The agent alternatively could have used the visitor's name or other identifying information to search for a potential matching co-browse session.

Figure 17:
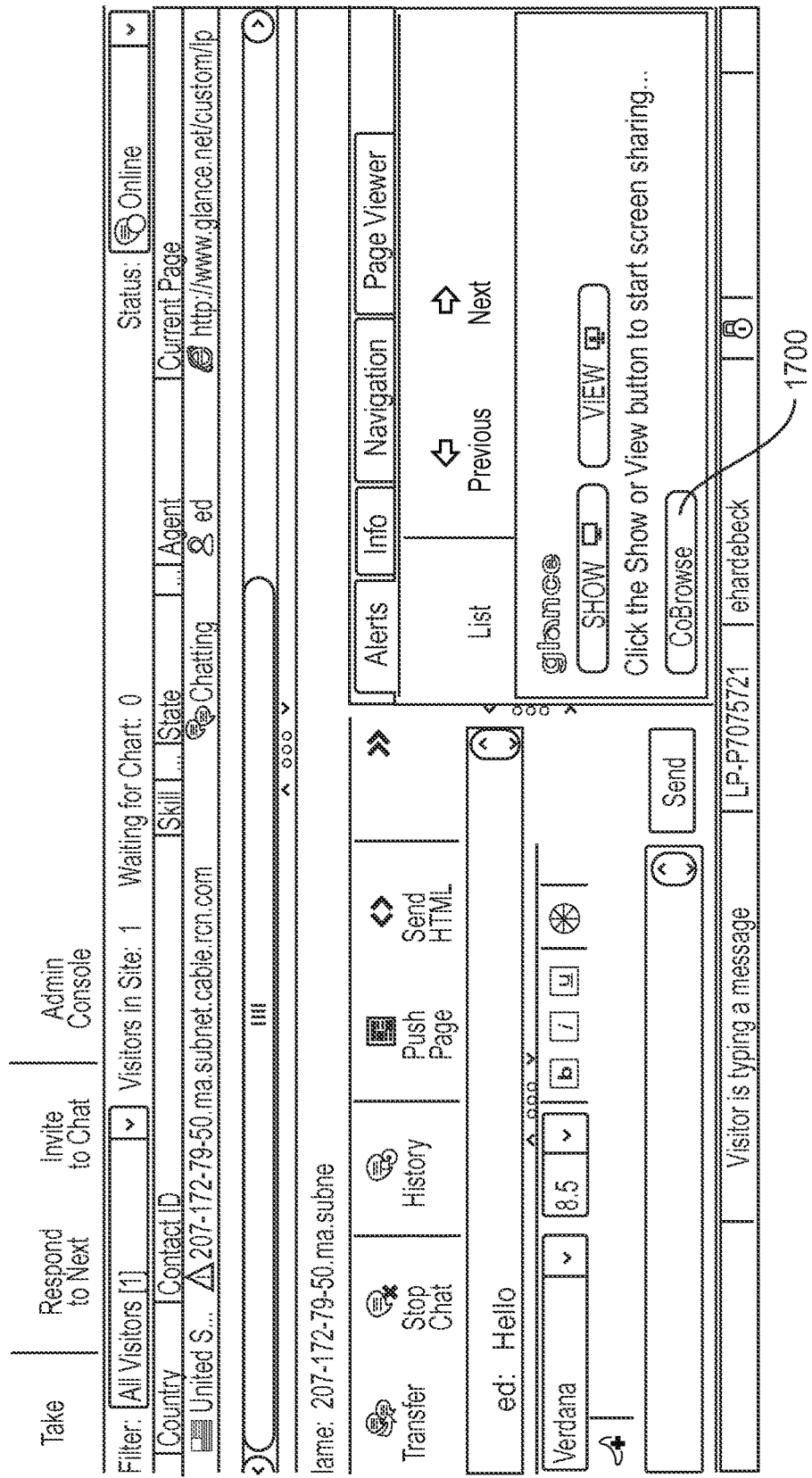

FIG. 17 shows an example agent screen for a chat service. As shown in FIG. 17, the agent may be provided with the ability to join a co-browse session through a button 1700 in the chat agent's screen. The chat service provides this agent view to enable the agent to interact with the visitor on the chat session, without asking the visitor to do anything. In the embodiment shown in FIG. 17, the agent can click on button 1700 to automatically join the co-browse session associated with the visitor that is taking part on the chat session. The agent may initiate the co-browse session with no visitor action. Optionally, the agent may offer the visitor the opportunity to participate in the co-browse session, and provide the visitor with the ability to accept the co-browse session.

In one embodiment, to enable a chat service to track visitors to a web site, the chat service will include script on the web site. This chat service script will cause the visitor's browser to periodically poll the chat service to determine if there has been a change of state. For example, a rule at the chat service may cause the chat service to serve a popup or overlay to the website asking the visitor if they would like to initiate a chat session.

The chat service has the ability to insert additional script into the visitor's browser. According to an embodiment, the co-browse script is downloaded to the visitor by the chat service to enable a co-browsing session to be initiated. The co-browse script may be downloaded based on a rule at the chat service, such as whenever a user selects an item for inclusion in a shopping cart, or when a chat agent selects a co-browse button to initiate a co-browse session with the visitor. Many ways of triggering the download of co-browse script may be used to cause the co-browse script to be provided to the visitor. Optionally information to be used by the co-browse server to identify the co-browse session (e.g. visitor ID or session ID) may be included in the co-browse script that is downloaded to the visitor. Thus, a chat session need not be started for the chat service to download co-browse script to the visitor.

In another embodiment, when the visitor starts a chat session JavaScript (e.g. cobrowse.js) is downloaded and installed into the visitors browser. In this embodiment, the JavaScript contains an instruction for the visitor's browser to poll a session status server with an identifying value. The session status server may be the chat service server, the co-browse server, or another server on the network. The identifying value, in one embodiment, is uniquely associated with the chat session between the agent and the visitor.

If the agent clicks on co-browse button 1700, the agent co-browser will initiate a co-browsing session to create state associated with the identifying value. This will cause the server session status at the polling server to be changed to indicate that a co-browsing session has started and will identify the correct Cserver which will host the co-browsing session. When the visitor's browser detects that the co-browsing session has started, it will send browser state to the Cserver which will be forwarded to the agent. This will enable the agent to see the view of the visitor's browser. The agent will wait until the visitor connects to the session and then the agent will connect to the session to start receiving data.

Since the JavaScript is downloaded to the visitor in connection with script provided by the chat service, the co-browse JavaScript will cause the visitor's browser to be visible to the agent without requiring the visitor to take any further action—the visitor is not required to click on a button to indicate that they would like the agent to be able to see the browser. To protect the security of the visitor's information, the JavaScript that is downloaded on the chat session also includes a list of masked items to prevent sensitive information associated with the masked fields from being forwarded to the agent on the co-browse session.

Although the preceding description was provided in connection with a chat based communication session, similar location and joining co-browsing sessions may occur in connection with voice-based communication sessions. Specifically, if the visitor clicks on a button to initiate a telephone call, e.g. a "click-to-call" button, and enters a phone number, the identifying information provided by the visitor may be used by the agent to locate and optionally initiate a co-browsing session with the visitor.

Polling Minimization

There are instances where parties may wish to communicate via a communication session, such as a co-browse session, screen sharing session, Voice over IP session, or web conferencing session. Where one party starts the session, and the other party does not know of the session, the other party needs to be provided with information to enable the other party to join the session. As noted above, multiple types of communication sessions may experience this problem. Although an example solution will be provided in connection with co-browsing, similar solutions may be utilized with the other forms of communication sessions.

For example, as noted above, it is possible for an agent to initiate a co-browsing session with a visitor, and then have the visitor join the co-browsing session to enable the agent to view the visitor's browser. In this situation, the agent may initiate a co-browsing session to enable the agent to view what is being shown on the visitor's browser. However, the visitor does not know that the agent has initiated a co-browsing session and, hence the JavaScript at the visitor does not know to start forwarding information about the content of the visitor browser.

In this situation, it may be possible for the JavaScript at the visitor to periodically poll the connection server to determine if a co-browse session has been initiated by an agent. Continuous polling of the co-browse webserver enables the co-browse webserver to periodically notify the visitor as to whether a co-browsing session has been initiated by the agent to enable the JavaScript to learn the identity of the server hosting the session and enable the JavaScript at the visitor to begin forwarding updates on the co-browse session.

However, for the co-browse webserver, using continuous polling (or rapid polling) is resource intensive. For example, if the co-browse webserver is affiliated with several websites, each of which has thousands of visitors, even if each visitor only polls the connection webserver once per second, the co-browse webserver would still need to handle many thousands of transactions per second just to handle status updates for visitors who are likely to have no pending co-browse session.

As the number of identifiable visitors to the website increases, having the visitor JavaScript continuously poll for the availability of a co-browse session does not scale. While the rapidity at which the visitor polls the co-browse webserver may be decreased, this introduces a potential time lag between when the agent selects a co-browse session and when the agent first starts receiving data from the visitor.

There are several ways to fix this. For example, as noted above, it is possible for the visitor to click on a specific button or other feature of the web site associated with the co-browse server (e.g. a button included on the web site). This enables the visitor to poll the co-browse webserver but is limited to an implementation where the website has a feature associated with the co-browse service.

According to an embodiment, the co-browse JavaScript includes a poll module designed to capture specific actions by the user and interpret these actions as a trigger to poll the co-browse webserver to determine whether a co-browse session has been initiated. Causing the visitor to poll the co-browse webserver when the user performs a specific action reduces the frequency with which the visitor will poll the co-browse webserver, which hence reduces the number of poll transactions the co-browse webserver must handle.

For example, assume a visitor is at a web site and is being helped by the agent. The agent, in this scenario, clicks on a button or other function to initiate a co-browse session. To enable the visitor to poll for the co-browse session, and hence to enable the visitor to find the co-browse session, the agent can instruct the visitor to take an unusual action on the web site such as left or right clicking on a blank area of the web site, selecting a portion of the website without an identifiable function by selecting a portion of the first website without a link, shake their mobile device, cause their mouse to do three circles, select a particular letter or other character, or to take any other unusual action. The JavaScript at the visitor is configured to look for the specific action specified by the agent. When the JavaScript detects the specific action, it causes the poll trigger module to transmit a poll to the co-browse webserver. The co-browse webserver receives some piece of identification information from the poll, such as a visitor token, visitor ID, or other value, and searches for a co-browse session associated with that value. As noted above, the agent in this scenario knows the visitor and, hence, is able to specify the visitor token, visitor ID, or other value when the agent started the co-browse session. The co-browse webserver uses the visitor token, visitor ID, or other value to find the co-browse session started by the agent and provides identifying information to the visitor (such as the identity of the Cserver handling the session). The visitor then starts transmitting data on the co-browse session so that the agent can view the web page being shown in the visitor's browser.

By way of example, assume a visitor is logged into a web site such as a retailer's shopping cart, a bank website, software as a service, gaming, or using a common universal login such as Facebook or Google. The visitor and agent are communicating by chat or phone, and the agent hence knows the identity of the visitor. The agent may find the visitor in the agent's database (e.g. CRM system) and obtain a visitor's unique token data. Alternatively the token may be created when the visitor contacts the agent to initiate communication with the session. In any event, both the agent and the visitor have the same token. The agent initiates a co-browse session specifying the token to the co-browse service. The visitor performs an "unusual" action to cause the JavaScript to poll the co-browse service for the existence of a co-browse session associated with the token. The co-browse service matches the poll with the pending session and enables the agent and visitor to be connected to the communication session (co-browse session in this example).

There are many types of unusual events that may be detected. For example, on a mobile device or other device with a motion sensor, JavaScript in the browser can detect shake events using DeviceMotionEvents, which is part of the HTML5 working draft. There is no specific "shake" event, rather a shake would be defined as a specific pattern of motion reported by the DeviceMotionEvents. Likewise, not all browsers necessarily support the events yet and not all handle the coordinates the same way, but depending on the implementation a shake event could cause the JavaScript to poll the co-browse webserver. In this implementation, an agent who is talking or chatting with a visitor would instruct the visitor to shake their phone/other device. When the visitor shakes their phone, the JavaScript running on the visitor's device will poll the co-browse webserver to enable the visitor to become visible to the agent.

In another embodiment, the visitor and agent need not even be communicating with each other prior to the shake event. In this embodiment, the co-browse JavaScript is running in the visitor's browser but the co-browse JavaScript has not initiated a connection (poll) to the co-browse webserver. A co-browse session is initiated for each identifiable visitor, but an agent is not associated with the co-browse session. The visitor has been instructed, however, that help is available on the website and that the visitor can shake their phone to solicit help. When the visitor shakes their phone/device the JavaScript detects the shake event and initiates a connection with the co-browse webserver. This causes the visitor to join the co-browse session and an agent supporting the website receives a notification that a visitor would like help. The agent is connected to the co-browse session and can see what the visitor is viewing. The visitor is identified to the web site and this identification is used to enable the visitor and agent to also interact via voice or chat using one of the other methods described herein.

Other unexpected events, other than shake events, may likewise be captured. Example unexpected events, which may be captured by the co-browse JavaScript and used as a trigger to send a connection request to the co-browse webserver include single or double clicking (or single or double tapping on a touch sensitive screen) on a region of the web page not affiliated with a link. For example, the visitor may be instructed to click/double click on a blank portion of the web site. When this occurs the JavaScript running in the browser would capture the event and interpret the event to cause a poll to be sent to the co-browse webserver.

Another unexpected event may be a pinch motion followed by an unpinch motion on a touch sensitive screen. The user may be instructed to pinch (to cause the web page to zoom out) and then to unpinch (to cause the web page to zoom in). This dual action, within a specified time period such as within a second, may be used as a trigger.

Another unexpected event may be to rotate the mouse in circles. On a touch sensitive screen, a similar gesture on the screen may be captured when the user touches the screen and draws a series of circles on the screen, draws a particular letter on the screen, does a diagonal swipe, or otherwise performs a particular gesture which has infrequent use during normal navigation of a website.

It may be expected that visitors may happen to perform the unusual action occasionally when not intending to initiate a co-browse session. However, if the action used as the trigger is sufficiently unusual, the number of connection requests forwarded to the co-browse webserver will be significantly reduced compared to having all visitors to a website periodically poll for the availability of a co-browsing session.

Social Media

Social Media sites such as Facebook enable users to share content such as pictures, text, and other updates of interest. A person has a feed, which is a running update of items that they add to their personal page. According to an embodiment, a co-browse session access link may be posted on the person's feed, which will allow other people with access to their feed to join the visitor and participate in a co-browse session with the visitor. For convenience an implementation will be described in which the social media site is Facebook™, although the concepts described herein may be used with other social media sites as well. This enables many social applications, such as social shopping in which users co-browse with each other while shopping at websites available on the network.

In one embodiment, a user has a Facebook app installed in their Facebook profile which will enable co-browse sessions to be added to their Facebook feed. When the user encounters a website that is co-browse enabled (the website contains the co-browse JavaScript), or if the user has a plugin containing the co-browse JavaScript, the user may be provided with an option to post a co-browse link on their Facebook feed. The co-browse link contains a pointer to the co-browse server hosting the co-browse session as well as a session identifier that may be used to identify the co-browse session at the co-browse server. When a friend clicks on the co-browse link, a browser window is launched which operates in the manner described above in connection with the agent, to enable the Facebook friend to join the co-browse session. Additional friends (followers) can also join and watch (the leader). If the leader enables remote control, followers can take turns controlling where the leader's browser goes.

Figure 18:
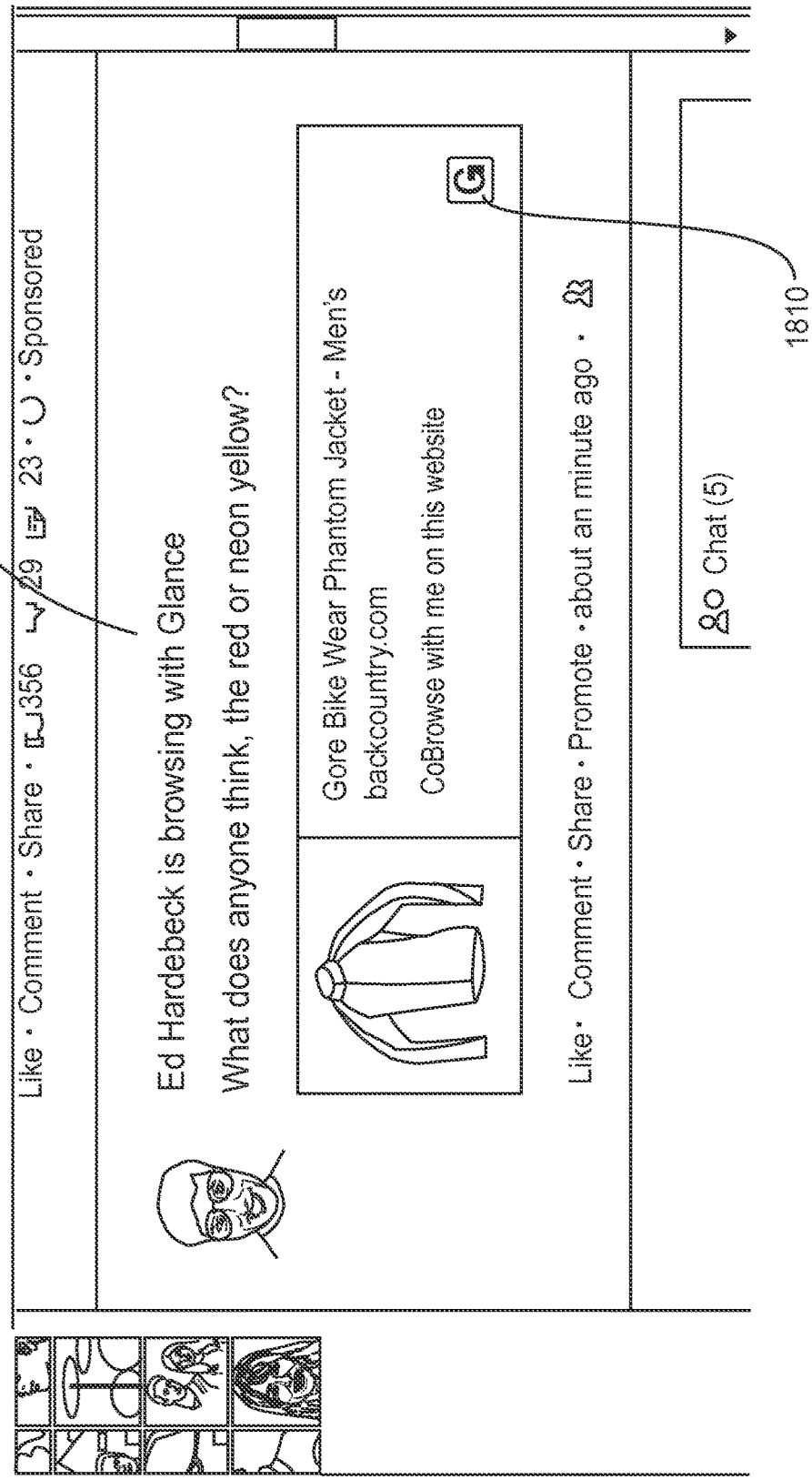
FIG. 18 shows an example integration of co-browsing with social media.

FIG. 18 shows an example post to a feed in a social media website. As shown in FIG. 18, the post 1800 includes a link 1810 to a co-browse session that may be used by anyone with access to the post to join a co-browse session associated with the owner of the feed. For example, if a person is shopping and would like fashion advice, the person could post a co-browse invitation to their Facebook feed to invite their friends to co-browse with them while they shop for clothes. Although the co-browsing link 1810 in FIG. 18 is shown as being posted to a feed, alternatively the co-browsing link 1810 could be sent via text message or email to an individual or targeted group to allow those individuals receiving the link to join the co-browsing session or to join a scheduled co-browsing session at some point in the future.

In another embodiment, visitors to a web site are identified on the web site and compared with a list of Facebook friends, Outlook contacts, or another list of known acquaintances. The visitor is then presented with an indication that one of their Facebook friends or Outlook contacts is concurrently visiting the web site, and provided with an opportunity to launch a co-browse session with the acquaintance.

As another example, a visitor to a site may be invited to join other users also on the site to co-browse with those users to enable communal browsing.

In yet another example, a co-browsing session may be initiated whenever a person puts an item in their shopping cart. The co-browsing session may persist after the visitor leaves the site and an email or text message may be sent to the user with a co-browse invitation that the user can use to return to the site or to the last page where the user was located within the site.

In another embodiment, a visitor on a site with Facebook integration may be provided with a sidebar list of friends (friends who are their Facebook friends) who are also on the site. If a user clicks on one of their friends a co-browsing session with the friend (or an option to join a co-browsing session with the friend) may be provided to the visitor (e.g., by initiating a Facebook chat with a click-to-view-my-browsing link).

Co-Browse and Screen Sharing Integration

There are instances where it would be advantageous to integrate the benefits available from screen sharing with co-browsing. For example, when an agent is viewing a co-browsing session with a visitor, it may be desirable to provide a live video feed of the agent to the visitor. Likewise, the agent may want to provide the visitor with a video feed available to the agent from another device connected to the Agent's computer, such as the live video from the screen of a connected tablet computer, smartphone, document camera, etc. According to an embodiment, the connection achieved between the visitor and agent to initiate the co-browse session is leveraged to connect the two participants into a screen sharing session over which content from the agent is provided to the visitor.

Providing the ability to incorporate screen sharing sessions into a co-browsing session enables an escalating interactive experience to occur when a visitor initiates a chat session or makes a phone call to an agent associated with a web site. What starts out as a chat session/phone call to customer support may escalate to a co-browsing session in which the agent is able to see the visitor's view of the web site. The agent may then use screen sharing technology to provide live content to the visitor which is selected for the visitor based on the visitor's location on the web site. For example, to enable the visitor to have a human connection with the agent a live view of the agent may be provided to the visitor, e.g. in a tiny inset within the web site or in area 310 of the floating tab 300 in FIGS. 3A and 3B. The live feed of the agent may be captured by a camera and provided via screen sharing software to the visitor to be displayed to the visitor. As the interaction between the agent and visitor continues, the agent may select other content to be provided to the visitor. This additional content may be a demonstration that the agent launches on their screen which is shared with the visitor via a screen sharing session or may be a selection of another live video feed.

As noted above, the Agent has the ability to see the visitor's web browser by virtue of the co-browse session. The agent does not, however, have the native ability to see other things which appear on the visitor's screen since the visitor is not implementing screen sharing software. To enable the agent to see the content that is being provided to the visitor, in one embodiment the agent is automatically joined as a participant to the one or more screen sharing sessions. This allows the agent to not only be the source of the content, but also a consumer of the content, that is being shown on the screen sharing session. This may be useful, for example, where a live video of the agent is being provided to the visitor on a screen sharing session. By causing the agent to be included as a guest in the screen sharing session the agent may be provided with a representation of the video that the visitor is being provided so that the agent knows exactly what the visitor is seeing.

Integrating screen sharing with co-browsing may be useful in many contexts, including sales, customer support, technical support, etc. Screen sharing may be implemented using the AJAX viewer described in U.S. patent Ser. No. 13/239,757, filed Sep. 22, 2011, entitled Method and Apparatus for Facilitating Participation in a Remote Viewing Session, the content of which is hereby incorporated herein by reference.

One advantage of using this combination, is that a two-way web conference is enabled without requiring the visitor to download and install any software. Specifically, the co-browse does not require any download or Java/Flash/Silverlight or plug-in on the visitor's side. Just as valuable, the AJAX viewer screen share technology lets the agent show things to the visitor, again without requiring any download to the visitor. Thus, unlike traditional two-way web conferencing, where both participants need to have installed software, this combination lets the Agent see and show without any download to the visitor. Moreover, it works for any modern browser, including mobile devices, since it does not rely on Java or Flash which may not be supported in particular browsers.

Although an example was provided in which a co-browse session was escalated to a screen sharing session, the opposite order is possible as well. In this embodiment, an agent launches a screen sharing session with a visitor. For example, the visitor and agent may be communicating via a chat session or by voice, and the agent may launch a screen sharing session to enable the visitor to obtain content provided by the agent. During the course of the screen sharing session, the visitor may be asked to enable the agent to see what is being shown in the visitor's browser. The visitor may then initiate a co-browse session to show back to the agent what is currently being displayed in the visitor's browser using any of the connection methods described above. This allows an agent, who is helping a visitor, to both show information to the visitor using a screen sharing session and then to view the visitor's screen using a co-browsing session, all without requiring the visitor to download and install software, plugin, etc.

As noted above, in one embodiment an agent may show information to the visitor by opening a screen sharing viewer in a div layered on top of the visitor's browser page, and cause another portion of the website or anything else on the agent's screen to be visible within the screen sharing viewer.

Figure 22:
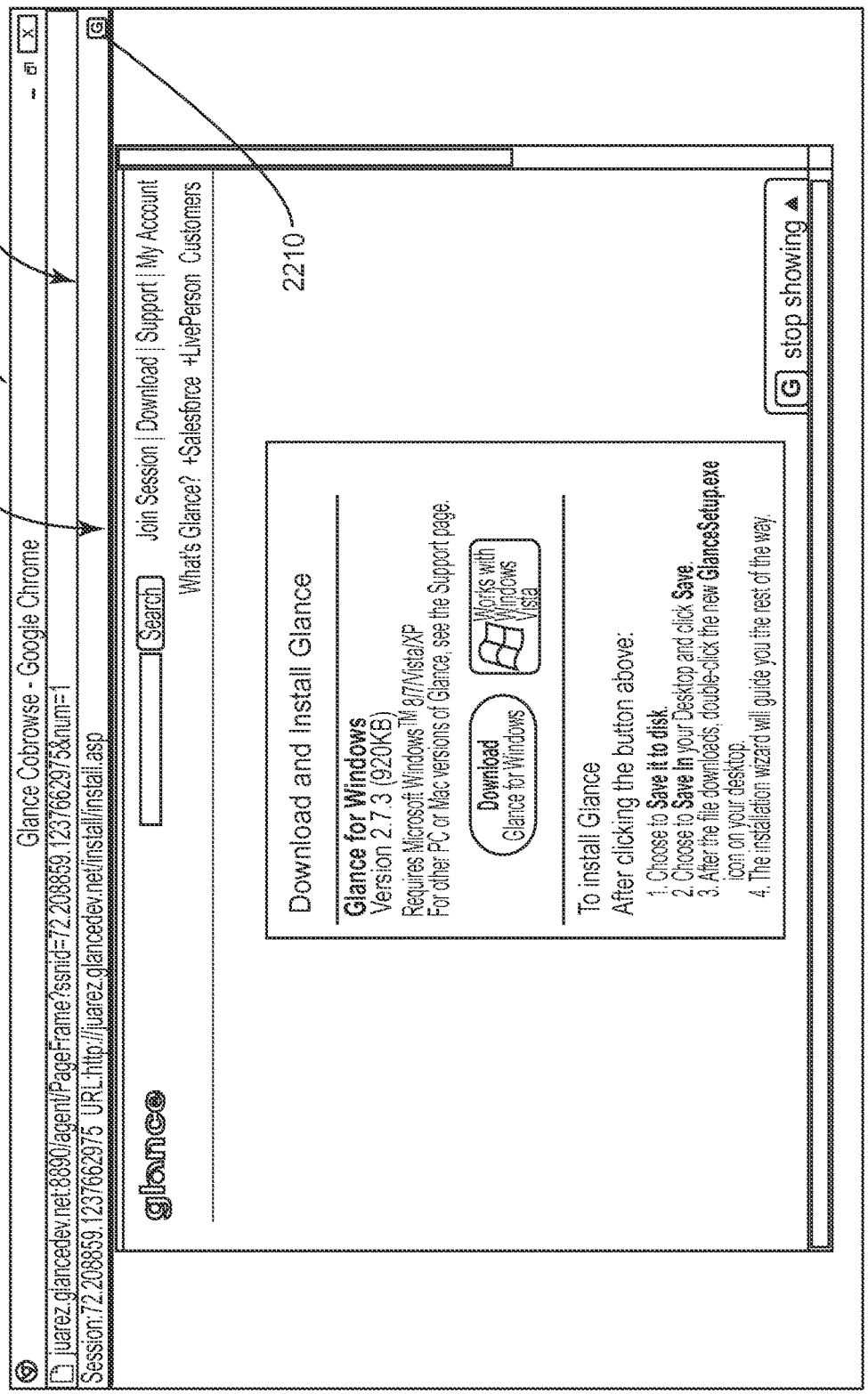
FIGS. 22-28 show an example way of integrating screen sharing sessions with co-browsing.

FIG. 22 shows an example screen shot of a co-browse agent view 2200 according to an embodiment. As shown in FIG. 22, the agent view includes an icon 2210 in the co-browse agent view header 2220. The co-browse agent view 2200 also includes a field 2230 showing the content of the visitor's browser.

Figure 23:
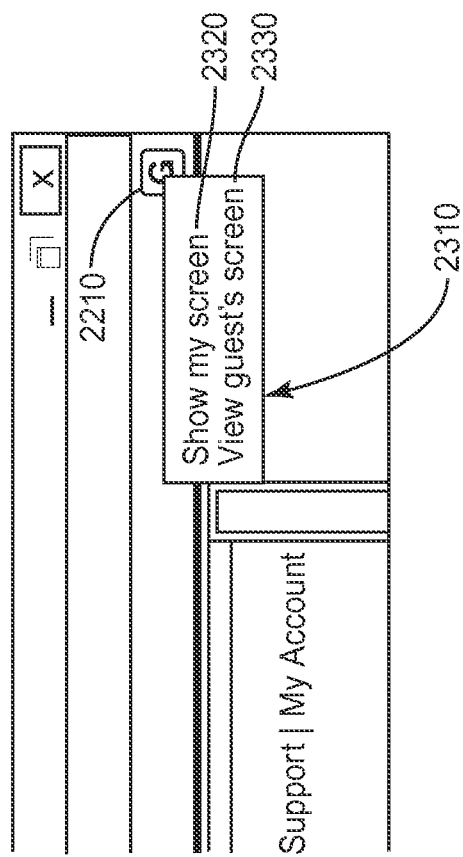
Figure 24:
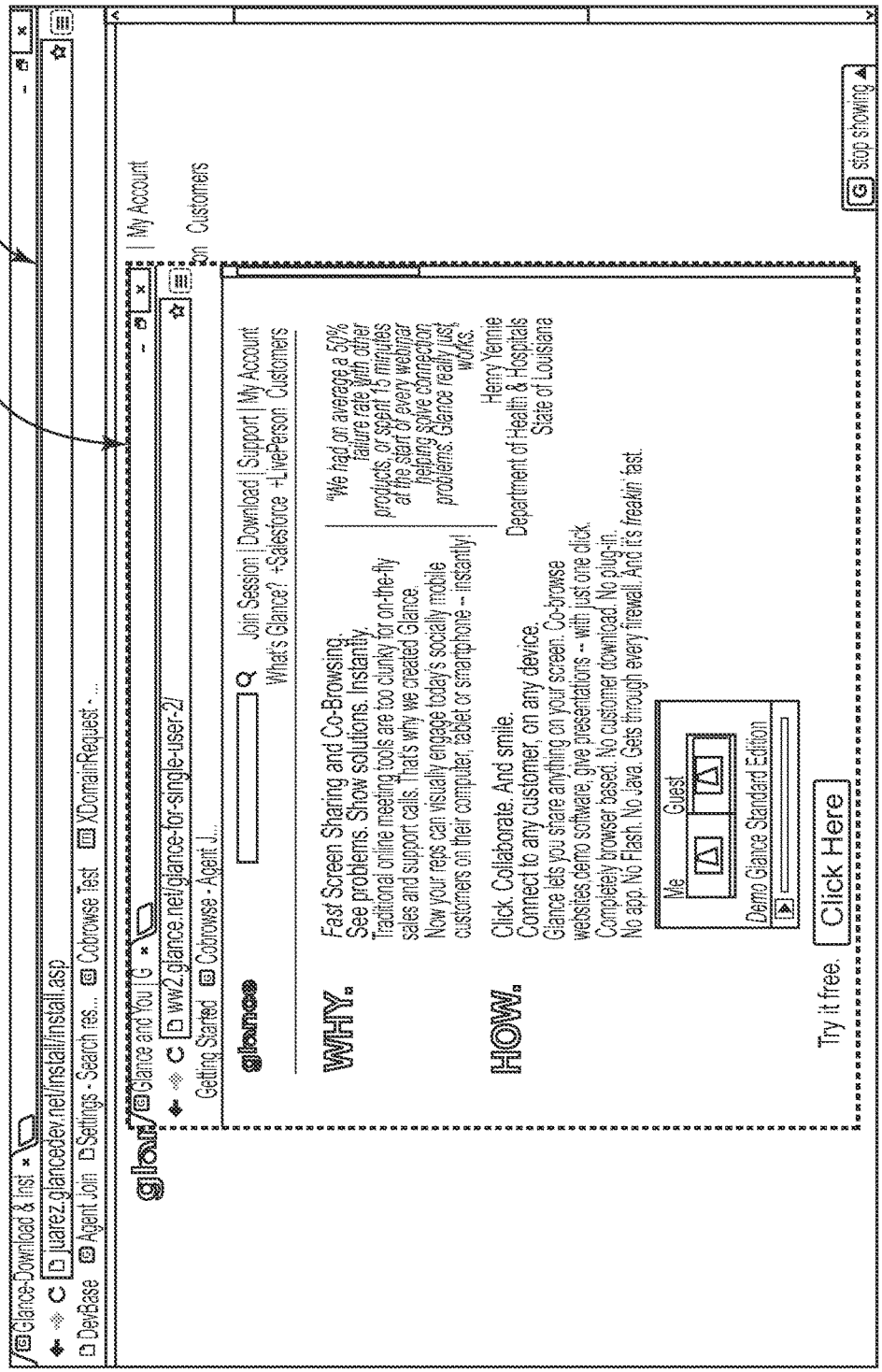

FIG. 23 shows a popup 2310 that is generated when the agent clicks on the icon 2210. As shown in FIG. 23, the popup 2310 includes a menu of options, including an option to allow the agent to show the agent's screen 2320 and an option to allow the agent to view the visitor's screen 2330. FIG. 24 shows the visitor's view if the agent selects the option to show the agent's screen 2320, and FIGS. 25-27 show a sequence of views if the if the agent selects the option to view the visitor's screen 2330.

FIG. 24 shows the visitor's view if the agent selects the option to show the agent's screen 2320. As shown in FIG. 24, when the agent initiates a screen sharing session and opts to show the contents of the agent's screen, a view of the agent's screen 2400 will be overlayed on top of the visitor's browsing session 2410. The view of the agent's screen may contain information from any source desired by the agent. Accordingly, the agent may opt to include a view of the agent's screen, a video source such as a quick time video source of an attached device, images from an attached camera, or any other available video stream. Although not shown in FIG. 24, upon selecting the option to show the agent's screen the agent may be provided with a dialog through which the agent is allowed to select the source of video to be provided to the visitor over the screen sharing session. Although the view of the agent's screen is rendered in a div layered on top of the visitor's page, the screenshare view is not included in the agent's co-browse viewer, to avoid confusion where there agent would be seeing an image of his own screen.

Figure 25:
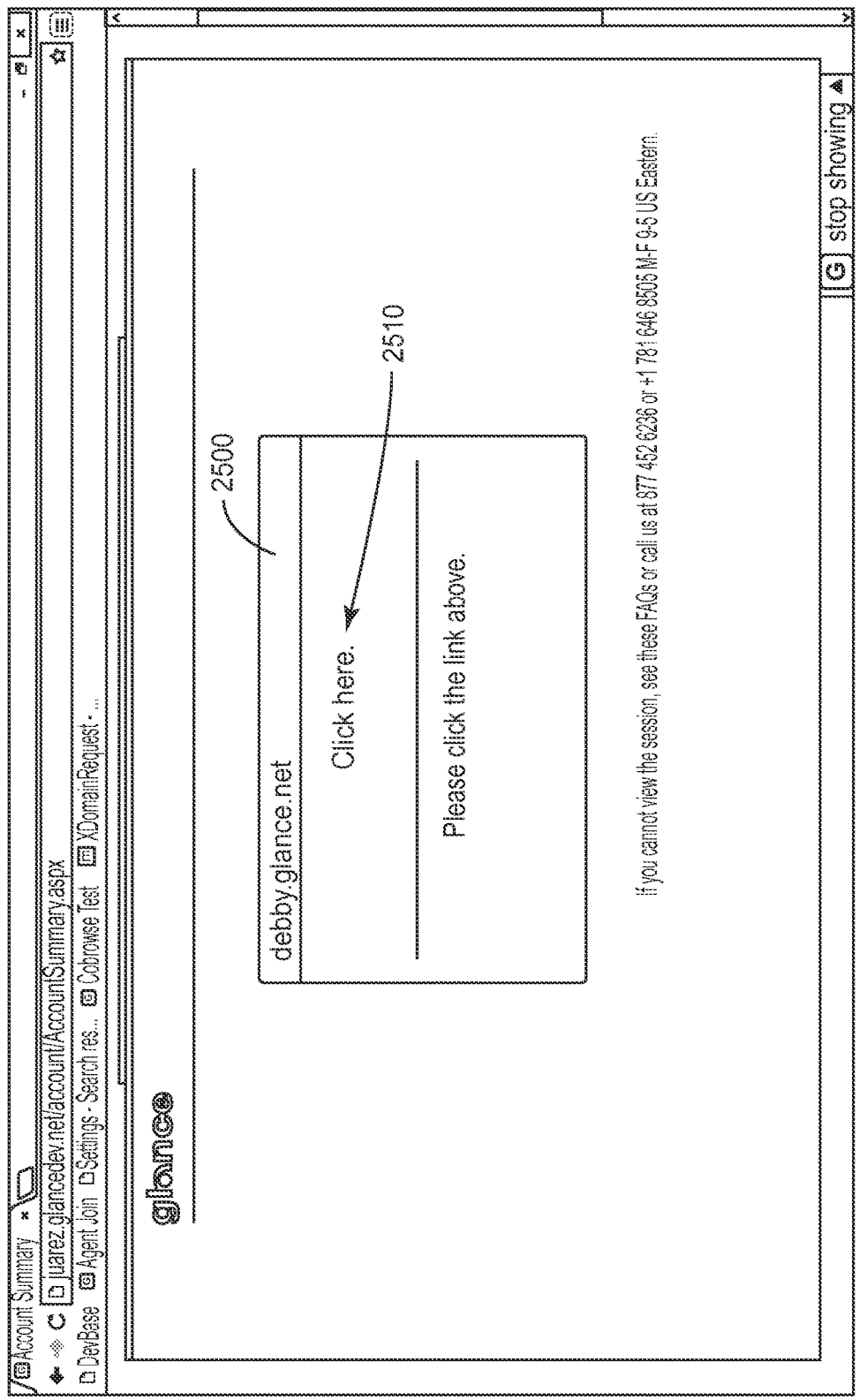
Figure 26:
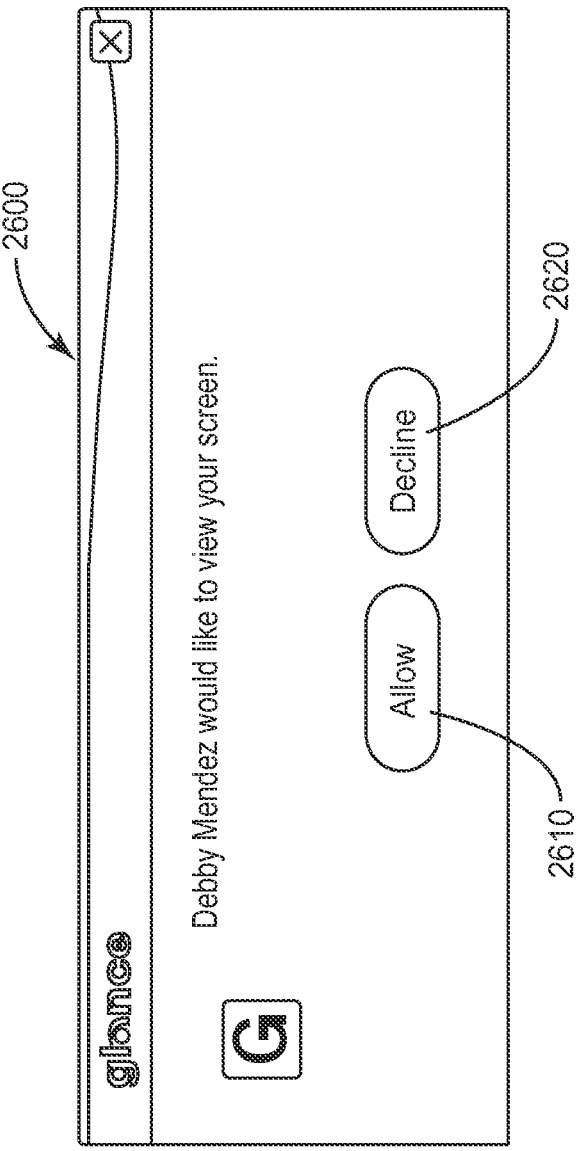
Figure 27:
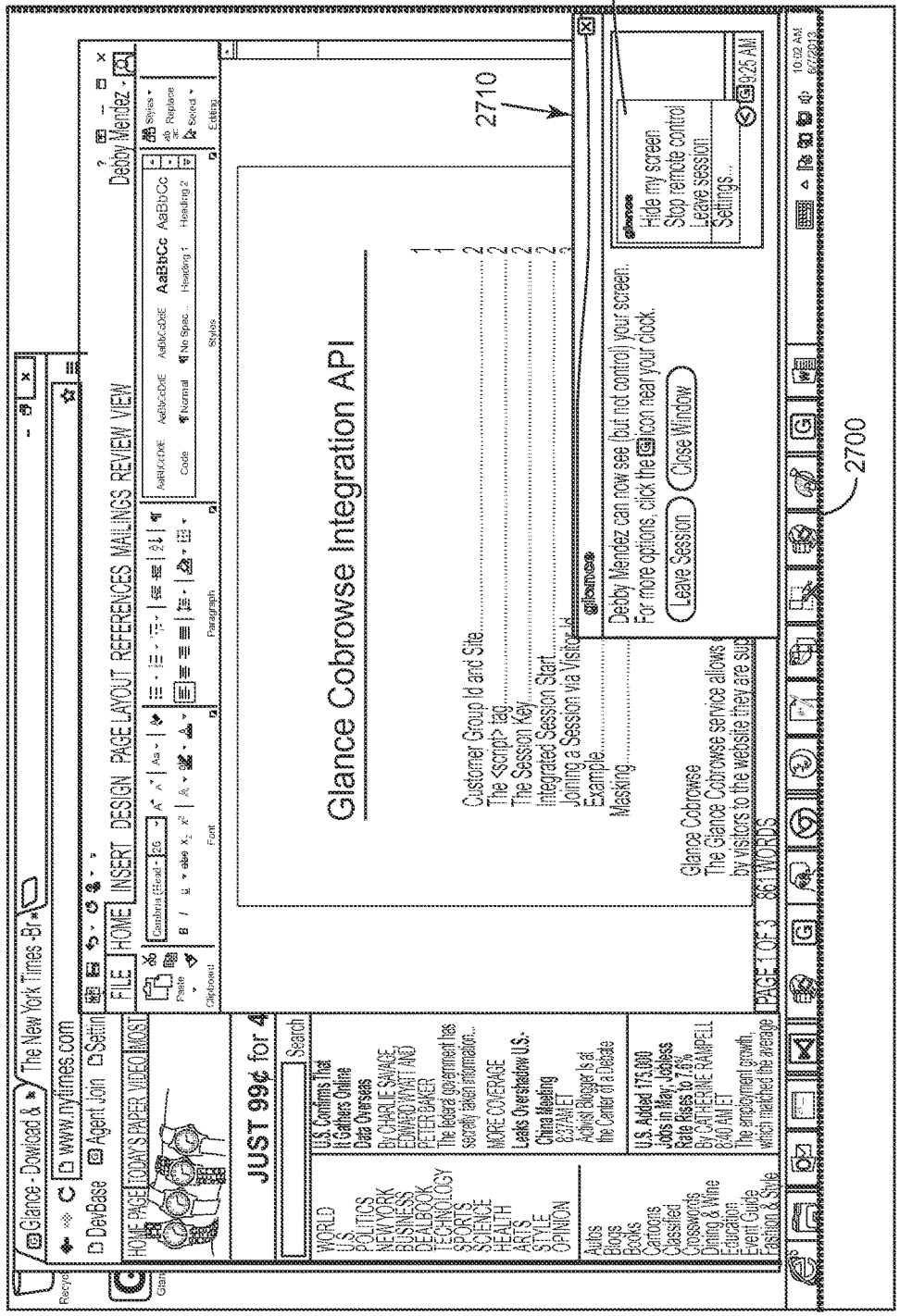

FIGS. 25-27 show a sequence of views which occur at the visitor side if the agent elects to initiate a screen sharing session in which the visitor's screen will be shown to the agent (button 2330 in FIG. 23). Starting a screen sharing session, in one embodiment, requires the visitor's screen to be captured using screen sharing software. An example screen sharing software that may be used for this purpose is commercially available from Glance Networks, although the invention is not limited to an implementation that uses Glance Networks screen sharing software.

Screen sharing software may need to be installed. Accordingly, as shown in FIG. 25, if the visitor does not have screen sharing software installed, the visitor will be provided with a dialog 2500 prompting the visitor to download the screen sharing software client. If the visitor clicks on link 2510 the screen sharing software client download will initiate. If the visitor already has the screen sharing software client downloaded, the step shown in FIG. 25 is not necessary and is skipped.

FIG. 26 shows a view of the visitor's screen once the screen sharing software client has been downloaded to the visitor, and when a screen sharing session is to be started on which the visitor's screen will be shown to the agent. As shown in FIG. 26, the visitor is prompted with a notification 2600 showing that the agent has initiated a screen sharing session and enabling the visitor to either allow the screen sharing session 2610 or decline the screen sharing session 2620. If the visitor clicks "decline" 2620 the screen sharing session is terminated. If the visitor clicks "accept" 2610, the screen sharing session is initiated and the visitor's screen will be captured and transmitted to the agent to be viewed by the agent.

FIG. 27 shows the visitor's view of their screen if the visitor clicks "accept 2610" once a screen sharing session has been initiated in which the agent is viewing the visitor's screen. As shown in FIG. 27, a colored border 2700 is placed around the visitor's screen to indicate to the visitor that the visitor is sharing the content of what is shown on the display with the agent. A dialog 2710 is also provided through which the visitor is able to control the screen sharing session. For example, in box 2720 of dialog 2710 the visitor is provided with options such as to allow the agent to have remote control over the visitor's computer, stop remote control by the agent, end the screen sharing session, etc.

Figure 28:
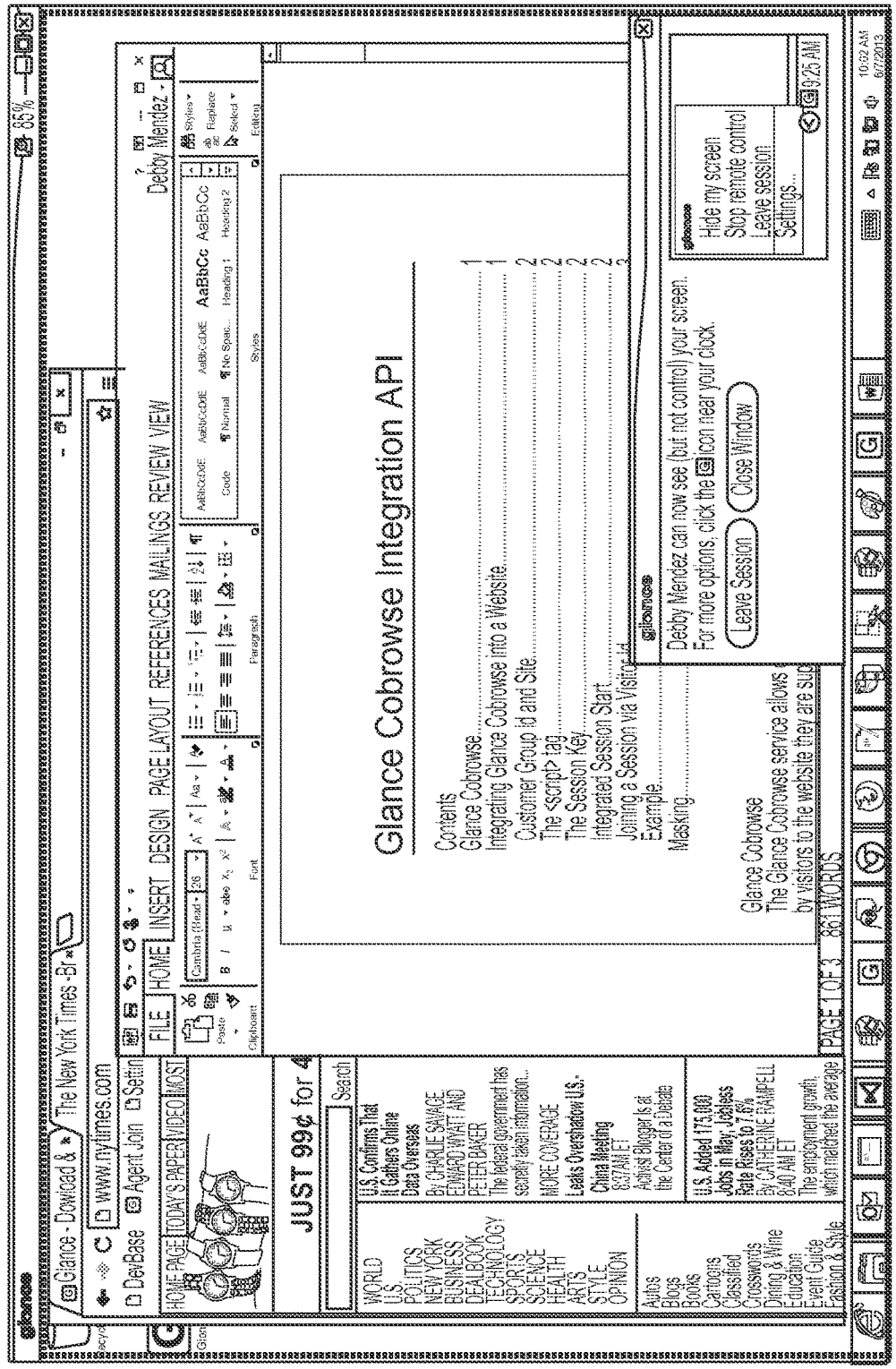

FIG. 28 shows the agent's view of the visitor's screen when a screen sharing session showing the visitor's screen has been initiated. As shown in FIG. 28, the agent is able to see the same content of the visitor's screen as the visitor is able to see. Rather than simply seeing the content of the visitor's browser, as was available during the co-browsing session, use of a screen sharing session enables the visitor to see more of the visitor's computer display by including aspects of the display in addition to the visitor's browser. Further, since the screen sharing software enables remote control in which the person viewing the screen sharing software is able direct operation of the host's computer, the agent is able to use the screen sharing session to not only see the visitor's screen but also control operation of the visitor's computer. As noted above, remote control by the agent is a privilege granted by the visitor, so the visitor has the option to resume control of their computer at any point during the screen sharing session.

Secret Co-Browse

It is possible to have the JavaScript launch a co-browse session automatically without the knowledge of the visitor. This enables people monitoring the site to watch how visitors use the site to determine which links may be difficult to find and which aspects of the site might cause confusion. Likewise, website monitors or agents who are monitoring a website may view co-browsing sessions of visitors to determine what a particular visitor is looking at on the web site and choose to proactively initiate contact with the visitor if desired.

In one embodiment a service such as a chat service tracks visitors as they visit a web site. In this embodiment, the chat service (e.g. Live Person) tags the visitor with a unique identifying number (key). The Agent is provided with a list of visitors as well as the keys that tag those visitors. JavaScript (cobrowse.js) downloaded from the web site causes the visitor's browser to poll a server for any session started that is associated with the key.

If the agent decides to participate in a co-browsing session with a visitor, the agent selects the visitor from a list or otherwise instructs software on the agent system to initiate a co-browsing session associated with the key. The key is then passed to a co-browse server which notifies the polling server that a co-browse session associated with the key has been initiated.

When the visitor polls the polling server, the polling server will return a positive value to the visitor which will cause the cobrowse.js to provide browser state on the co-browsing session to the co-browse server. The agent waits till the visitor connects to the co-browsing session and then the agent connects.

In this embodiment, the visitor does not to take any action to pass information to the agent. Rather, the tracking server, in this instance LivePerson, assigns a tracking value (key) to the visitor and provides this key to the agent. JavaScript provided by the web site is used to cause the visitor browser to poll for sessions associated with the key, and similarly co-browse JavaScript is used to cause the visitor's web browser to participate in the co-browsing session. The visitor does not need to do anything to participate in the co-browsing session and likewise likely will not know that what is they see in their browser during their browsing session is also being seen by an agent associated with the web site. This has the further advantage of enabling the agent to start the session without requiring the user to do anything—i.e. without requiring the user to click on a particular tab or other feature of the website. Likewise, the service could also record the sessions for marketing intelligence, training, law enforcement, and other purposes.

The methods described herein may be implemented as software configured to be executed in control logic such as contained in a CPU of an electronic device such as a computer. The functions described herein may be implemented as sets of program instructions that are stored in a non-transitory tangible computer readable medium. When implemented in this manner, the computer program includes a set of instructions which, when executed by a computer, cause the computer to perform a method to implement the functions described above. Programmable logic can be fixed temporarily or permanently in a non-transitory tangible computer readable medium such as a read-only memory chip, a computer memory, a disk, or other storage medium. In addition to being implemented in software, the logic described herein can be embodied using discrete components, integrated circuitry, programmable logic used in conjunction with a programmable logic device such as a Field Programmable Gate Array (FPGA) or microprocessor, or any other device including any combination thereof. All such embodiments are intended to fall within the scope of the present invention.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense.

What is claimed is:

1. A method of connecting participants to a co-browse communication session hosted by a co-browse service, the method comprising the steps of:

loading a first website and co-browse script into a visitor browser by a website visitor,
the co-browse script being configured to poll the co-browse service for existence of the co-browse communication session,
the co-browse script further being configured to transmit co-browse information of the visitor browser on the co-browse communication session;

initiating the co-browse communication session at the co-browse service on a webserver, the co-browse communication session being associated with identifying information of the website visitor and initiated by a person other than the website visitor, the co-browse service enabling co-browsing access to the person other than the website visitor to view, in real time, the web browsing activity of the visitor browser on the website;

detecting, by the co-browse script loaded into the visitor browser, an unusual action of the website visitor;

in response to detecting the unusual action, polling the co-browse service, by the co-browse script loaded into the visitor browser, for the existence of the co-browse communication session associated with the identifying information of the website visitor; and if a response from the co-browse service indicates that the co-browse communication session associated with the identifying information of the website visitor exists, initiating transmission of the co-browse information to the co-browse service by the co-browse script loaded into the visitor browser; and if the response from the co-browse service indicates that the co-browse communication session associated with the identifying information of the website visitor does not exist, not transmitting the co-browse information to the co-browse service by the co-browse script loaded into the visitor browser, wherein the step of polling the co-browse service is not performed until after the step of initiating the co-browse communication session at the co-browse service; and wherein the unusual action is selecting a portion of the first website without an identifiable function by selecting a portion of the first website without a link.

2. The method of claim 1, wherein the co-browse script is configured to capture DOM changes of the visitor browser and forward the DOM changes of the visitor browser as the co-browse information on the co-browse communication session.

3. The method of claim 1, wherein the person other than the website visitor is an agent providing customer support for the website.

4. A non-transitory tangible computer readable storage medium having stored thereon a computer program for implementing a method of connecting a visitor browser of a website visitor to a co-browse communication session hosted by a co-browse service and initiated at the co-browse service by a person other than the website visitor, the computer program comprising a set of instructions which, when executed by a computer, causes the computer to perform a method comprising the steps of:

loading a first website and co-browse script into the visitor browser, the co-browse script being configured to poll the co-browse service on a webserver for existence of the co-browse communication session, the co-browse script further being configured to transmit co-browse information of the visitor browser on the co-browse communication session;

detecting, by the co-browse script loaded into the visitor browser, an unusual action of the website visitor;

in response to detecting the unusual action, polling the co-browse service, by the co-browse script loaded into the visitor browser, for the existence of the co-browse communication session initiated by the person other than the website visitor and associated with identifying information of the website visitor; and if a response from the co-browse service indicates that the co-browse communication session associated with the identifying information of the website visitor exists, initiating transmission of the co-browse information to the co-browse service by the co-browse script loaded into the visitor browser, the co-browse service enabling co-browsing access to the person other than the website visitor to view, in real time, the web browsing activity of the visitor browser on the website; and if the response from the co-browse service indicates that the co-browse communication session associated with the identifying information of the website visitor does not exist, not transmitting the co-browse information to the co-browse service by the co-browse script loaded into the visitor browser, wherein the step of polling the co-browse service is not performed until after the step of initiating the co-browse communication session at the co-browse service; and wherein the unusual action is selecting a portion of the first website without an identifiable function by selecting a portion of the first website without a link.

5. The non-transitory tangible computer readable storage medium of claim 4, wherein the co-browse script is configured to capture DOM changes of the visitor browser and forward the DOM changes of the visitor browser as the co-browse information on the co-browse communication session.

6. The non-transitory tangible computer readable storage medium of claim 4, wherein the person other than the website visitor is an agent providing customer support for the web site.

7. A method comprising:

loading a web page and co-browse script into a website visitor browser, the co-browse script being configured to poll a co-browse service on a web server for existence of a co-browse communication session hosted by the co-browse service and initiated at the co-browse service by a second user other than the website visitor, the co-browse script further being configured to transmit co-browse information of the website visitor browser on the co-browse communication session;

detecting, by the co-browse script, an unusual action associated with interaction between a first user and the website visitor browser;

upon detection of the unusual action, polling the co-browse service by the co-browse script loaded into the website visitor browser for the existence of the co-browse communication session on which the web page loaded by the website visitor browser will be viewable by the second user; and if the co-browse communication session exists, transmitting, by the co-browse script to the co-browse service the co-browse information of the website visitor browser on the co-browse communication session, to cause the web page loaded by the website visitor browser to be viewable by the second user, the co-browse service enabling co-browsing access to the second user to view, in real time, the web browsing activity of the visitor browser on the website;

wherein the unusual action is selecting a portion of the website without an identifiable function by selecting a portion of the website without a link.

8. The method of claim 7, wherein the second user is an agent providing customer support to the website visitor.

* * * * *